(12) United States Patent
Yamaguchi et al.

(10) Patent No.: US 7,778,785 B2
(45) Date of Patent: Aug. 17, 2010

(54) SIGNAL-TO-NOISE RATIO MEASUREMENT FOR DISCRETE WAVEFORM

(75) Inventors: Takahiro Yamaguchi, Tokyo (JP); Masayuki Kawabata, Tokyo (JP); Mani Soma, Seattle, WA (US); Masahiro Ishida, Tokyo (JP)

(73) Assignee: Advantest Corporation (JP)

( * ) Notice: Subject to any disclaimer, the term of this patent is extended or adjusted under 35 U.S.C. 154(b) by 167 days.

(21) Appl. No.: 12/030,879

(22) Filed: Feb. 14, 2008

(65) Prior Publication Data
US 2009/0207897 A1 Aug. 20, 2009

(51) Int. Cl.
*G01R 29/26* (2006.01)

(52) U.S. Cl. .............................. 702/75; 702/69; 702/72; 702/76

(58) Field of Classification Search .................. 702/66, 702/69, 75–76
See application file for complete search history.

(56) References Cited

U.S. PATENT DOCUMENTS

| | | | | |
|---|---|---|---|---|
| 4,412,299 A | * | 10/1983 | Huffman | 702/72 |
| 6,281,819 B1 | * | 8/2001 | Wu et al. | 341/120 |
| 6,525,523 B1 | | 2/2003 | Soma et al. | |
| 2002/0103609 A1 | * | 8/2002 | Kuyel | 702/69 |

\* cited by examiner

*Primary Examiner*—Hal D Wachsman
*Assistant Examiner*—Mi'schita' Henson
(74) *Attorney, Agent, or Firm*—Chen Yoshimura LLP

(57) ABSTRACT

There is provided a measuring apparatus for measuring a signal-to-noise ratio of a discrete waveform which is output from an AD converter in response to an input signal, where the signal-to-noise ratio indicates a ratio of a signal component of the input signal to noise generated by the AD converter. The measuring apparatus includes a spectrum compensating section that receives a spectrum of the discrete waveform output from the AD converter, and compensates the received spectrum in accordance with a non-symmetric sideband between an upper sideband and a lower sideband of the received spectrum, where the upper and lower sidebands are defined with respect to a fundamental frequency of the input signal, and a phase noise waveform calculating section that calculates a phase noise waveform of the discrete waveform based on the spectrum which has been compensated by the spectrum compensating section.

17 Claims, 28 Drawing Sheets

SIGNAL-TO-NOISE RATIO MEASUREMENT FOR DISCRETE WAVEFORM

BACKGROUND

1. Technical Field

The present invention relates to a measuring apparatus, a test apparatus, a recording medium, a program and an electronic device. More particularly, the present invention relates to a measuring apparatus for measuring jitter of a signal under measurement, and to a measuring apparatus for measuring jitter generated by an AD converter.

2. Related Art

One of the methods to measure jitter generated by an AD converter is to input an input signal and a sampling clock into the AD converter and measure jitter included in the output from the AD converter. Here, the input signal is a sine wave with small jitter, for example, and the sampling clock also has small jitter. The jitter generated by the AD converter represents, for example, the variance in the aperture delay from the zero cross timing of the sampling clock at which a start conversion command is given to the moment at which the level of the input signal is held. This jitter is also referred to as aperture jitter.

The aperture jitter indicates the random variation in the time required to hold an analog input. Accordingly, the aperture jitter is considered to be one type of instantaneous phase noise.

The sampling clock supplied to a high-resolution AD converter has very small jitter, that is to say, phase noise. For example, the jitter is −140 dBc/Hz when the offset frequency is equal to 100 kHz. This necessitates expensive special measuring equipment for the measurement. Therefore, there is a demand for a method and an apparatus which can accurately measure the sampling clock with very small jitter at a low cost.

The jitter contained in the output from the AD converter may be measured based on the spectrum obtained by performing Fourier transform on the output discrete waveform from the AD converter. For example, the root mean square (RMS) value of the jitter and the signal to noise ratio, SNR, are estimated based on the energy of the noise component contained in the spectrum.

The SNR is defined as the ratio of signal power to noise power. The signal power and the noise power are measured with respect to the observable positive frequencies. The noise that may be generated by the AD converter 400 includes quantization noise, aperture jitter and thermal noise. Such varieties of noise degrade the SNR.

The SNR due to the quantization noise and the aperture jitter, and the sampling clock jitter, generated by the AD converter is represented by the following equation.

$$SNR = 10\log_{10}\left\{\frac{\left(\frac{V_{FS}}{2}\right)^2}{\frac{\Delta^2}{12} + \left(\frac{V_{FS}}{2}\right)^2 (2\pi f_{in})^2 \sigma_{\Delta\phi}^2}\right\} [dB] \quad \text{Equation 1}$$

Here, $V_{FS}/2$ denotes the amplitude of the analog sine wave input into the AD converter, $f_{in}$ denotes the frequency of the sine wave, $\Delta$ denotes the quantization step of the AD converter, and $\sigma_{\Delta\phi}$ denotes the aperture jitter.

As seen from the equation 1, when the sine wave input into the AD converter has a sufficiently low frequency, the $SNR_Q$ is dominated by the quantization noise. In other words, the equation 1 becomes the following equation indicating a constant value.

$$SNR \to SNR_Q = 10\log_{10}\left\{\frac{\left(\frac{V_{FS}}{2}\right)^2}{\frac{\Delta^2}{12}}\right\} \quad \text{Equation 2}$$
$$= 6.02B_e + 1.76 \, [dB]$$

On the other hand, when the frequency $f_{in}$ is sufficiently high and the quantization step is sufficiently small, the $SNR_T$ is dominated by the aperture jitter. Accordingly, the equation 1 becomes the following equation. The $SNR_T$ linearly changes with respect to the logarithmic frequency $\log_{10} f_{in}$.

$$SNR \to SNR_T = 10\log_{10}\frac{1}{(2\pi f_{in}\sigma_{\Delta\phi})^2} [dB]$$

Which is to say, $$SNR_T \propto -20\log_{10} f_{in} - 20\log_{10}\sigma_{\Delta\phi} \quad \text{Equation 3}$$

FIG. 28A illustrates, as an example, the relation between the effective number of bits ENOB of the AD converter and the frequency of the analog input which is applied into the AD converter. As stated earlier, the $ENOB_Q$ remains at a substantially constant value in the region where the analog input has a low frequency, that is to say, $f_{in}$<100 MHz. On the other hand, the $ENOB_T$ changes linearly in the region where the analog input has a high frequency, that is to say, $f_{in}$>100 MHz. To calculate the linear change, it is necessary to measure the ENOB at, at least, two frequencies in the region where the analog input has a high frequency.

FIG. 28B illustrates, as an example, the spectra obtained by performing the Fourier transform on the outputs from the AD converter. FIG. 28B shows the spectrum of the discrete waveform data output from the AD converter when a low-frequency input signal is applied to the AD converter, as shown in the left graph in FIG. 28B, and the spectrum of the discrete waveform data output from the AD converter when a high-frequency input signal is applied to the AD converter, as shown in the right graph in FIG. 28B.

Each of the spectra shown in FIG. 28B contains a signal component corresponding to the frequency of the input signal, for example, the component of the line spectrum in FIG. 28B, and a noise component generated by the AD converter, for example, the remaining components in FIG. 28B. Here, the noise component contains therein quantization noise component that is independent from the frequency of the input signal and a jitter component that is dependent on the frequency of the input signal. Therefore, it is assumed that the energy of the jitter component that is dependent on the frequency of the input signal can be obtained by calculating the difference $\Delta$ in the energy, that is to say, the sum of the signal component and the noise component, between the spectra, as illustrated in FIG. 28B. This assumption, however, has not been verified.

The ENOB of the AD converter with respect to the amplitude axis can be obtained by calculation based on the quantization noise component. Which is to say, the ENOB can be calculated based on the SNR of the spectrum of the discrete waveform data output from the AD converter when an input signal having a given frequency is input into the AD converter. However, no methods and apparatuses have been known which can measure the ENOB due only to the jitter component.

In order to estimate the jitter by measuring the difference between the spectra as described above, it is required to measure spectra twice. Also, it is not possible to measure the ENOB or SNR for which the aperture jitter is dominant, i.e. the $ENOB_T$ or $SNR_T$ in the right region in FIG. 28A, by using the analog input having the low frequency as shown in the left region in FIG. 28A The two spectra illustrated in FIG. 28B are observed at different timings, that is to say, not measured at the same time. Therefore, it is difficult to accurately isolate the jitter component contained in the noise component from the quantization noise component in the noise component. Additionally, since the above method calculates the jitter based on the energies of the noise components contained in the spectra, the above method can only calculate the RMS value of the jitter, but cannot calculate the change in the instantaneous value of the jitter such as the peak value and the peak-to-peak value, and the aperture jitter waveform. Therefore, it is difficult to provide feedback data to the design of the AD converter.

FIG. 29 illustrates a different method to measure the jitter based on the spectrum obtained by performing the Fourier transform on the output from the AD converter. This method extracts, from the spectrum, frequency components within a frequency range which is substantially symmetrical with respect to the fundamental frequency of the input signal and contains no harmonic components, and performs the inverse Fourier transform on the extracted frequency components. In this way, the method generates an analytic signal for the output waveform from the AD converter.

It is important to set, to zero, all of the harmonic components, which are strongly correlated to the signal, in order to measure the random variation in both the amplitude and the timing in the frequency domain. When the harmonic components are all set to zero, the spectrum is left with the line spectrum of the fundamental and the random noise.

Here, the instantaneous phase of the output waveform from the AD converter is obtained by the arctangent of the real and imaginary parts of the analytic signal, and the obtained instantaneous phase can be used to obtain the jitter. This method is disclosed in U.S. Pat. No. 6,525,523, for example.

Obtaining the instantaneous phase of the output waveform, this method can calculate the peak value, the peak-to-peak value and the like of the jitter. Note that performing the Fourier transform on the discrete waveform output from the AD converter produces the spectrum containing the harmonic components as illustrated in the left graph in FIG. 28B. Because of the aliasing effects, the line spectra of the harmonic components are present in the vicinity of the line spectrum of the fundamental. For this reason, when the frequency components that contain no harmonic components are extracted by using a filter in accordance with the method illustrated in FIG. 29, the observable frequency range is narrow and broadband jitter can not be measured.

As explained in the above, the method illustrated in FIG. 29 can not measure the noise component corresponding to the frequency which is far from the fundamental frequency of the input signal. To summarize, there is a demand for a method which can measure the peak value, the peak-to-peak value and the like of the jitter, and can measure jitter in a broad bandwidth. Here, since the conversion rate of the AD converter is expected to further increase, it is preferable to provide a method and an apparatus which can measure the intrinsic jitter component of the AD converter or the ENOB corresponding only to the jitter component of the sampling clock.

SUMMARY

Therefore, it is an object of an aspect of the innovations herein to provide a measuring apparatus, a test apparatus, a recording medium, a program and an electronic device, which are capable of overcoming the above drawbacks accompanying the related art. The above and other objects can be achieved by combinations described in the independent claims. The dependent claims define further advantageous and exemplary combinations of the innovations herein.

According to the first aspect related to the innovations herein, one exemplary measuring apparatus may include a measuring apparatus for measuring a signal-to-noise ratio of a discrete waveform which is output from an AD converter in response to an input signal, where the signal-to-noise ratio indicates a ratio of a signal component of the input signal to noise generated by the AD converter. The measuring apparatus includes a spectrum compensating section that receives a spectrum of the discrete waveform output from the AD converter, and compensates the received spectrum in accordance with a non-symmetric sideband between an upper sideband and a lower sideband of the received spectrum, where the upper and lower sidebands are defined with respect to a fundamental frequency of the input signal, and a phase noise waveform calculating section that calculates a phase noise waveform of the discrete waveform based on the spectrum which has been compensated by the spectrum compensating section.

According to the second aspect related to the innovations herein, one exemplary test apparatus may include a test apparatus for testing an AD converter, including a measuring apparatus that measures one of (i) a signal-to-noise ratio of a discrete waveform which is output from the AD converter in response to an input signal and (ii) an effective number of bits of the AD converter, and a judging section that judges whether the AD converter is acceptable based on a result of the measurement by the measuring apparatus. The measuring apparatus includes a spectrum compensating section that receives a spectrum of the discrete waveform output from the AD converter, and compensates the received spectrum in accordance with a non-symmetric sideband between an upper sideband and a lower sideband of the received spectrum, where the upper and lower sidebands are defined with respect to a fundamental frequency of the input signal, and a phase noise waveform calculating section that calculates a phase noise waveform of the discrete waveform based on the spectrum which has been compensated by the spectrum compensating section.

According to the third aspect related to the innovations herein, one exemplary recording medium may include a recording medium storing thereon a program that causes a computer to function as a measuring apparatus that measures a signal-to-noise ratio of a discrete waveform which is output from an AD converter in response to an input signal, where the signal-to-noise ratio indicates a ratio of a signal component of the input signal to noise generated by the AD converter. The program causes the computer to function as a spectrum compensating section that receives a spectrum of the discrete waveform output from the AD converter, and compensates the received spectrum in accordance with a non-symmetric sideband between an upper sideband and a lower sideband of the received spectrum, where the upper and lower sidebands are defined with respect to a fundamental frequency of the input signal, and a phase noise waveform calculating section that calculates a phase noise waveform of the discrete waveform based on the spectrum which has been compensated by the spectrum compensating section.

According to the fourth aspect related to the innovations herein, one exemplary program may include a program causing a computer to function as a measuring apparatus that measures a signal-to-noise ratio of a discrete waveform which is output from an AD converter in response to an input signal, where the signal-to-noise ratio indicates a ratio of a signal component of the input signal to noise generated by the AD converter. The program causes the computer to function as a spectrum compensating section that receives a spectrum of the discrete waveform output from the AD converter, and compensates the received spectrum in accordance with a non-symmetric sideband between an upper sideband and a lower sideband of the received spectrum, where the upper and lower sidebands are defined with respect to a fundamental frequency of the input signal, and a phase noise waveform calculating section that calculates a phase noise waveform of the discrete waveform based on the spectrum which has been compensated by the spectrum compensating section.

According to the fifth aspect related to the innovations herein, one exemplary measuring apparatus may include a measuring apparatus for measuring a signal-to-noise ratio of a discrete waveform which is output from an AD converter in response to an input signal, where the signal-to-noise ratio indicates a ratio of a signal component of the input signal to noise generated by the AD converter. The measuring apparatus includes a single sideband spectrum generating section that receives a spectrum of the discrete waveform output from the AD converter, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a phase noise waveform calculating section that calculates a phase noise waveform of the discrete waveform based on the single sideband spectrum.

According to the sixth aspect related to the innovations herein, one exemplary test apparatus may include a test apparatus for testing an AD converter, including a measuring apparatus that measures one of (i) a signal-to-noise ratio of a discrete waveform which is output from the AD converter in response to an input signal and (ii) an effective number of bits of the AD converter, and a judging section that judges whether the AD converter is acceptable based on a result of the measurement by the measuring apparatus. The measuring apparatus includes a single sideband spectrum generating section that receives a spectrum of the discrete waveform output from the AD converter, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a phase noise waveform calculating section that calculates a phase noise waveform of the discrete waveform based on the single sideband spectrum.

According to the seventh aspect related to the innovations herein, one exemplary recording medium may include a recording medium storing thereon a program that causes a computer to function as a measuring apparatus that measures a signal-to-noise ratio of a discrete waveform which is output from an AD converter in response to an input signal, where the signal-to-noise ratio indicates a ratio of a signal component of the input signal to noise generated by the AD converter. The program causes the computer to function as a single sideband spectrum generating section that receives a spectrum of the discrete waveform output from the AD converter, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a phase noise waveform calculating section that calculates a phase noise waveform of the discrete waveform based on the single sideband spectrum.

According to the eighth aspect related to the innovations herein, one exemplary program may include a program causing a computer to function as a measuring apparatus that measures a signal-to-noise ratio of a discrete waveform which is output from an AD converter in response to an input signal, where the signal-to-noise ratio indicates a ratio of a signal component of the input signal to noise generated by the AD converter. The program causes the computer to function as a single sideband spectrum generating section that receives a spectrum of the discrete waveform output from the AD converter, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a phase noise waveform calculating section that calculates a phase noise waveform of the discrete waveform based on the single sideband spectrum.

According to the ninth aspect related to the innovations herein, one exemplary measuring apparatus may include a measuring apparatus for measuring jitter of a clock signal under measurement. The measuring apparatus includes a signal measuring section that measures a waveform of an input signal with a predetermined sampling frequency, a frequency domain transforming section that transforms the waveform measured by the signal measuring section into a spectrum of a predetermined frequency range, a spectrum compensating section that detects a non-symmetric sideband in the predetermined frequency range between a sideband that is higher in frequency than a fundamental frequency of the input signal and a sideband that is lower in frequency than the fundamental frequency of the input signal, and compensates the spectrum obtained by the frequency domain transforming section in accordance with frequency components in the detected non-symmetric sideband, and a jitter measuring section that measures the jitter of the clock signal under measurement based on the spectrum which has been compensated by the spectrum compensating section.

According to the tenth aspect related to the innovations herein, one exemplary test apparatus may include a test apparatus for testing a device under test. The test apparatus includes a measuring apparatus that measures jitter of a clock signal under measurement output from the device under test, and a judging section that judges whether the device under test is acceptable based on the jitter measured by the measuring apparatus. The measuring apparatus includes a signal measuring section that measures a waveform of an input signal with a predetermined sampling frequency, a frequency domain transforming section that transforms the waveform measured by the signal measuring section into a spectrum of a predetermined frequency range, a spectrum compensating section that detects a non-symmetric sideband in the predetermined frequency range between a sideband that is higher in frequency than a fundamental frequency of the input signal and a sideband that is lower in frequency than the fundamental frequency of the input signal, and compensates the spectrum obtained by the frequency domain transforming section in accordance with frequency components in the detected non-symmetric sideband, and a jitter measuring section that measures the jitter of the clock signal under measurement based on the spectrum which has been compensated by the spectrum compensating section.

According to the eleventh aspect related to the innovations herein, one exemplary recording medium may include a recording medium storing thereon a program that causes a computer to function as a test apparatus for testing a device under test. The program causes the computer to function as a measuring apparatus that measures jitter of a clock signal under measurement output from the device under test, and a judging section that judges whether the device under test is acceptable based on the jitter measured by the measuring apparatus. Here, the program causes the computer functioning as the measuring apparatus to function as a signal measuring section that measures a waveform of an input signal with a predetermined sampling frequency, a frequency domain transforming section that transforms the waveform measured by the signal measuring section into a spectrum of a predetermined frequency range, a spectrum compensating section that detects a non-symmetric sideband in the predetermined frequency range between a sideband that is higher in frequency than a fundamental frequency of the input signal and a sideband that is lower in frequency than the fundamental frequency of the input signal, and compensates the spectrum obtained by the frequency domain transforming section in accordance with frequency components in the detected non-symmetric sideband, and a jitter measuring section that measures the jitter of the clock signal under measurement based on the spectrum which has been compensated by the spectrum compensating section.

According to the twelfth aspect related to the innovations herein, one exemplary program may include a program causing a computer to function as a test apparatus for testing a device under test. The program causes the computer to function as a measuring apparatus that measures jitter of a clock signal under measurement output from the device under test, and a judging section that judges whether the device under test is acceptable based on the jitter measured by the measuring apparatus. Here, the program causes the computer functioning as the measuring apparatus to function as a signal measuring section that measures a waveform of an input signal with a predetermined sampling frequency, a frequency domain transforming section that transforms the waveform measured by the signal measuring section into a spectrum of a predetermined frequency range, a spectrum compensating section that detects a non-symmetric sideband in the predetermined frequency range between a sideband that is higher in frequency than a fundamental frequency of the input signal and a sideband that is lower in frequency than the fundamental frequency of the input signal, and compensates the spectrum obtained by the frequency domain transforming section in accordance with frequency components in the detected non-symmetric sideband, and a jitter measuring section that measures the jitter of the clock signal under measurement based on the spectrum which has been compensated by the spectrum compensating section.

According to the thirteenth aspect related to the innovations herein, one exemplary measuring apparatus may include a measuring apparatus for measuring jitter of a clock signal under measurement. The measuring apparatus includes a signal measuring section that measures a waveform of an input signal with a predetermined sampling frequency, a frequency domain transforming section that transforms the waveform measured by the signal measuring section into a spectrum of a predetermined frequency range, a single sideband spectrum generating section that receives the spectrum of the waveform output from the signal measuring section, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a jitter measuring section that measures the jitter of the clock signal under measurement based on the single sideband spectrum generated by the single sideband spectrum generating section.

According to the fourteenth aspect related to the innovations herein, one exemplary test apparatus may include a test apparatus for testing a device under test. The test apparatus includes a measuring apparatus that measures jitter of a clock signal under measurement output from the device under test, and a judging section that judges whether the device under test is acceptable based on the jitter measured by the measuring apparatus. Here, the measuring apparatus includes a signal measuring section that measures a waveform of an input signal with a predetermined sampling frequency, a frequency domain transforming section that transforms the waveform measured by the signal measuring section into a spectrum of a predetermined frequency range, a single sideband spectrum generating section that receives the spectrum of the waveform output from the signal measuring section, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a jitter measuring section that measures the jitter of the clock signal under measurement based on the single sideband spectrum generated by the single sideband spectrum generating section.

According to the fifteenth aspect related to the innovations herein, one exemplary recording medium may include a recording medium storing thereon a program that causes a computer to function as a test apparatus for testing a device under test. The program causes the computer to function as a measuring apparatus that measures jitter of a clock signal under measurement output from the device under test, and a judging section that judges whether the device under test is acceptable based on the jitter measured by the measuring apparatus. Here, the program causes the computer functioning as the measuring apparatus to function as a signal measuring section that measures a waveform of an input signal with a predetermined sampling frequency, a frequency domain transforming section that transforms the waveform measured by the signal measuring section into a spectrum of a predetermined frequency range, a single sideband spectrum generating section that receives the spectrum of the waveform output from the signal measuring section, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a jitter measuring section that measures the jitter of the clock signal under measurement based on the single sideband spectrum generated by the single sideband spectrum generating section.

According to the sixteenth aspect related to the innovations herein, one exemplary program may include a program causing a computer to function as a test apparatus for testing a device under test. The program causes the computer to function as a measuring apparatus that measures jitter of a clock signal under measurement output from the device under test, and a judging section that judges whether the device under test is acceptable based on the jitter measured by the measuring apparatus. Here, the program causes the computer functioning as the measuring apparatus to function as a signal measuring section that measures a waveform of an input signal with a predetermined sampling frequency, a frequency domain transforming section that transforms the waveform measured by the signal measuring section into a spectrum of a predetermined frequency range, a single sideband spectrum generating section that receives the spectrum of the waveform output from the signal measuring section, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a jitter measuring section that measures the jitter of the clock signal under measurement based on the single sideband spectrum generated by the single sideband spectrum generating section.

According to the seventeenth aspect related to the innovations herein, one exemplary electronic device may include an electronic device that includes therein an AD converter and a data processing section that measures noise generated by the AD converter. The data processing section includes a spectrum compensating section that receives a spectrum of a discrete waveform which is output from the AD converter in response to an input signal, and compensates the received spectrum in accordance with a non-symmetric sideband between an upper sideband and a lower sideband of the received spectrum, where the upper and lower sidebands are defined with respect to a fundamental frequency of the input signal, and a phase noise waveform calculating section that calculates a phase noise waveform of the discrete waveform based on the spectrum which has been compensated by the spectrum compensating section.

According to the eighteenth aspect related to the innovations herein, one exemplary electronic device may include an electronic device that includes therein an AD converter and a data processing section that measures noise generated by the AD converter. The data processing section includes a single sideband spectrum generating section that receives a spectrum of a discrete waveform which is output from the AD converter, and generates a single sideband spectrum whose sideband is one of an upper sideband and a lower sideband of the received spectrum, where the upper sideband is higher in frequency than a fundamental frequency of the input signal and the lower sideband is lower in frequency than the fundamental frequency of the input signal, and a phase noise waveform calculating section that calculates a phase noise waveform of the discrete waveform based on the single sideband spectrum.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Some aspects of the invention will now be described based on embodiments, which do not intend to limit the scope of the present invention, but exemplify the invention. All of the features and the combinations thereof described in the embodiments are not necessarily essential to the invention.

Figure 1:
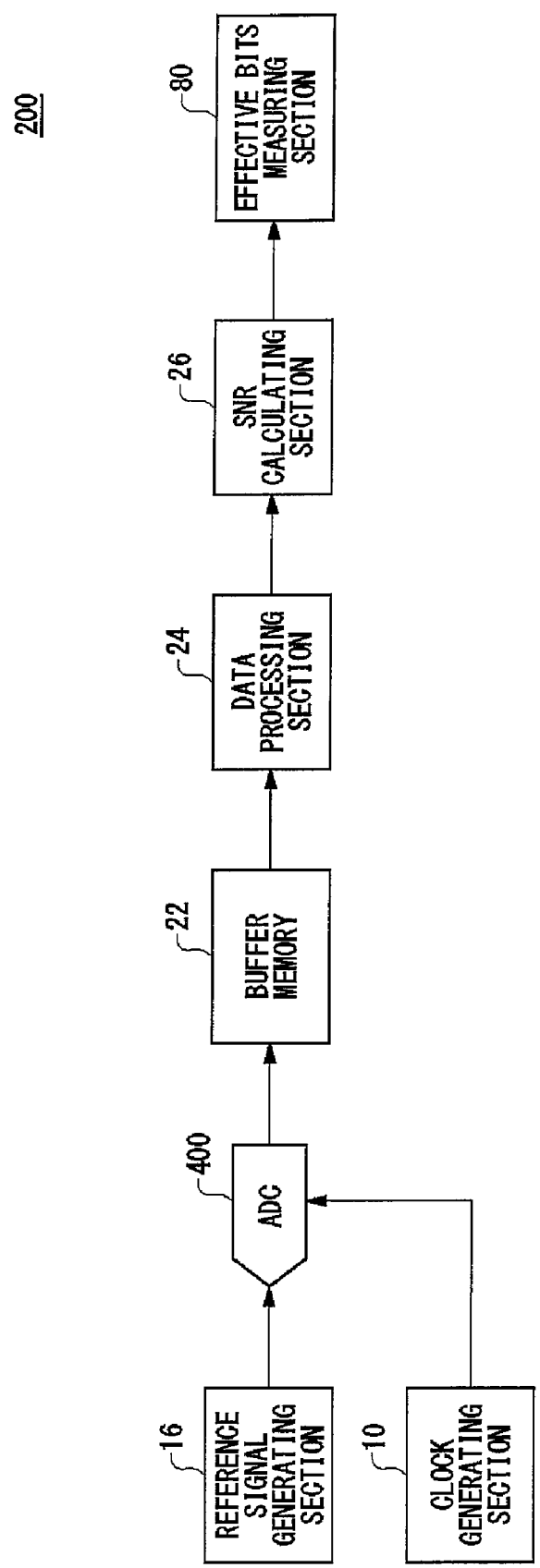
FIG. 1 illustrates an exemplary configuration of a measuring apparatus 200 relating to an embodiment of the present invention.

FIG. 1 illustrates an exemplary configuration of a measuring apparatus 200 relating to an embodiment of the present invention. The measuring apparatus 200 is configured to measure jitter which may be generated by an AD converter 400. The measuring apparatus 200 includes therein a reference signal generating section 16, a clock generating section 10, a buffer memory 22, a data processing section 24, an SNR calculating section 26, and an effective bits measuring section 80.

The reference signal generating section 16 generates an analog reference signal as an input signal to be applied to the AD converter 400. The reference signal generating section 16 may generate a periodic signal having a constant period, and apply the generated periodic signal to the AD converter 400. For example, the reference signal generating section 16 may apply a sinusoidal input signal to the AD converter 400, for example. The reference signal generating section 16 preferably generates an input signal having small jitter.

The clock generating section 10 inputs into the AD converter 400 a sampling clock used for the sampling of the input signal. For example, the clock generating section 10 may generate a clock signal having a constant period, and supply the generated clock signal to the AD converter 400. The clock generating section 10 preferably generates a sampling clock with no jitter or as small jitter as possible. The measuring apparatus 200 may be configured without the clock generating section 10. In this case, the measuring apparatus 200 may receive a sampling clock from an external oscillator, and supply the received sampling clock to the AD converter 400.

The AD converter 400 converts the analog input signal supplied thereto from the reference signal generating section 16 into a discrete waveform. Hereinafter, the signal output from the AD converter 400 is simply referred to as "the discrete waveform". For example, the AD converter 400 detects the level of the input signal in accordance with each rising edge of the sampling clock supplied thereto from the clock generating section 10, and outputs a digital data sequence, or an output code sequence, corresponding to the detected level of the input signal.

The buffer memory 22 stores thereon the discrete waveform, or the digital data sequence, output from the AD converter 400. The data processing section 24 processes the discrete waveform data stored on the buffer memory 22, to generate data to be supplied to the SNR calculating section 26. For example, the data processing section 24 may generate data indicating the phase noise in the discrete waveform based on the discrete waveform data.

The data processing section 24 may generate data indicating the phase noise generated by the AD converter 400. For example, the data processing section 24 may generate noise data which contains the phase noise generated by the AD converter 400 such as the aperture jitter but does not contain the amplitude noise generated by the AD converter 400 such as the quantization noise.

The data processing section 24 may generate a phase noise waveform in the time domain, or may generate a phase noise spectrum in the frequency domain. The configurations and operations of the data processing section 24 to generate the phase noise waveform in the time domain and the phase noise spectrum in the frequency domain are separately described later.

The SNR calculating section 26 calculates the signal-to-noise ratio SNR in the discrete waveform output from the AD converter 400, based on the data supplied thereto from the data processing section 24. The effective bits measuring section 80 measures the effective number of bits ENOB of the AD converter 400, based on the SNR calculated by the SNR calculating section 26. The operations of the SNR calculating section 26 and the effective bits measuring section 80 will be described later with reference to the equations 4 to 7.

With the configuration illustrated in FIG. 1, the measuring apparatus 200 can measure the SNR of the discrete waveform output from the AD converter 400 and the ENOB of the AD converter 400. When not required to measure the ENOB, the measuring apparatus 200 may be configured without the effective bits measuring section 80.

Figure 2:
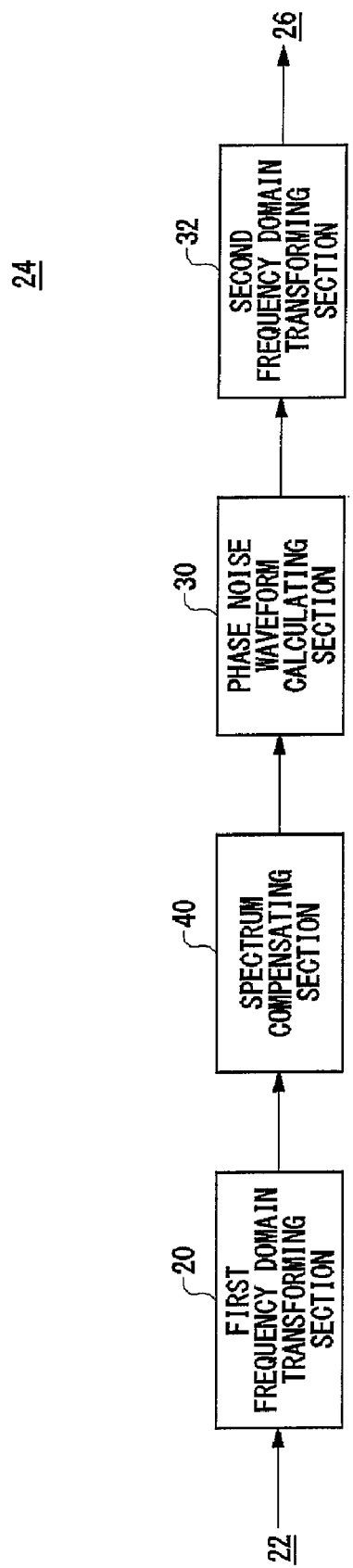
FIG. 2 illustrates an exemplary configuration of a data processing section 24.

FIG. 2 illustrates an exemplary configuration of the data processing section 24. According to the present example, the data processing section 24 supplies data which represents, in the frequency domain, the phase noise in the discrete waveform output from the AD converter 400, to the SNR calculating section 26. The data processing section 24 includes therein a first frequency domain transforming section 20, a spectrum compensating section 40, a phase noise waveform calculating section 30, and a second frequency domain transforming section 32.

The first frequency domain transforming section 20 transforms the discrete waveform obtained by the AD converter 400 into a spectrum having a predetermined frequency range. For example, the first frequency domain transforming section 20 may perform the Fourier transform on the data sequence output from the AD converter 400, to calculate the spectrum.

The first frequency domain transforming section 20 calculates a spectrum having a frequency range from −fs/2 to fs/2, in correspondence with the sampling frequency fs of the sampling clock. The first frequency domain transforming section 20 may eliminate the negative frequency components from the spectrum so as to obtain a spectrum having a frequency range from zero to fs/2, and input the obtained spectrum into the spectrum compensating section 40.

The spectrum compensating section 40 compensates the non-symmetric sidebands in the spectrum. Specifically speaking, the spectrum compensating section 40 receives the spectrum output from the first frequency domain transforming section 20, and detects a non-symmetric portion between the two sidebands centered around the fundamental frequency of the input signal. Based on the detected non-symmetric portion, the spectrum compensating section 40 compensates the spectrum by multiplying the spectrum by a fixed number. The detailed operation of the spectrum compensating section 40 will be described later with reference to FIGS. 3A to 3C.

The phase noise waveform calculating section 30 measures the phase noise waveform, that is to say, jitter in the input signal based on the compensated spectrum obtained by the spectrum compensating section 40. The phase noise waveform calculating section 30 may generate an analytic signal by performing the inverse Fourier transform on the compensated spectrum, and measure the phase noise waveform based on the generated analytic signal. The detailed operation of the phase noise waveform calculating section 30 will be described later with reference to FIGS. 9 to 12.

The second frequency domain transforming section 32 transforms the phase noise waveform calculated by the phase noise waveform calculating section 30 into a spectrum in the frequency domain. For example, the second frequency domain transforming section 32 may calculate the spectrum in the frequency domain by performing the Fourier transform on the phase noise waveform.

According to the present example, the SNR calculating section 26 calculates the SNR of the discrete waveform output from the AD converter 400, based on the spectrum of the phase noise waveform which is extracted by the second frequency domain transforming section 32. The SNR calculating section 26 may calculate the SNR by using the method described later with reference to the equation 4.

Figure 3A:
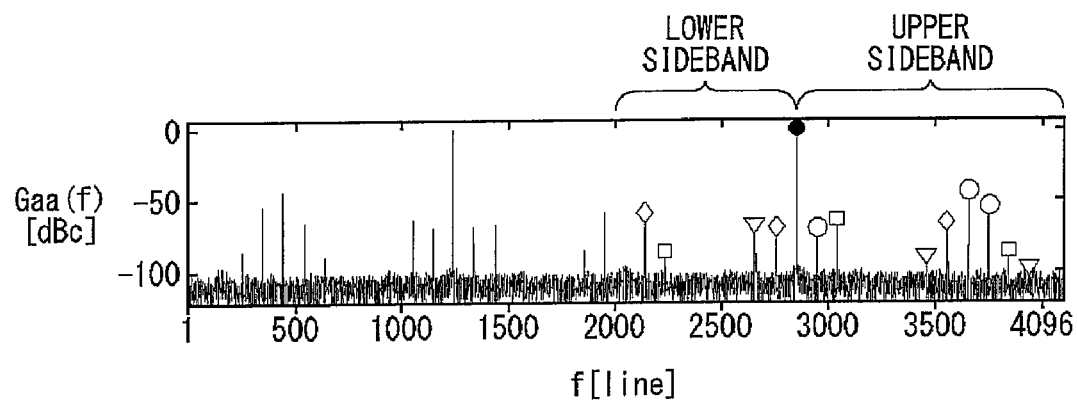
FIG. 3A illustrates an example of the spectrum output from a first frequency domain transforming section 20.
Figure 3B:
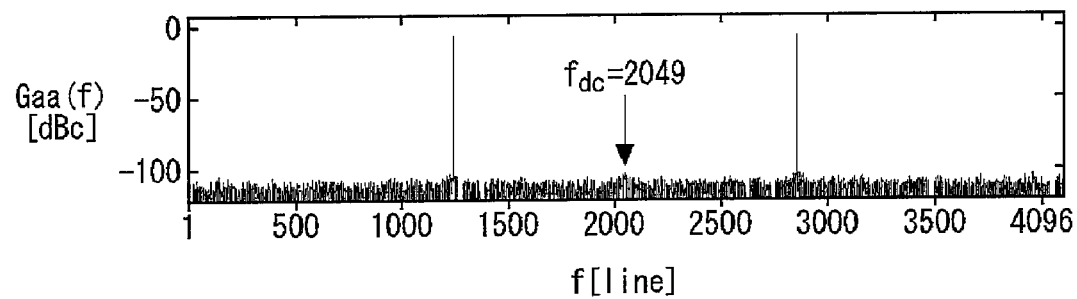
FIG. 3B illustrates the spectrum obtained as a result of eliminating the line spectra of the harmonics from the spectrum illustrated in FIG. 3A.
Figure 3C:
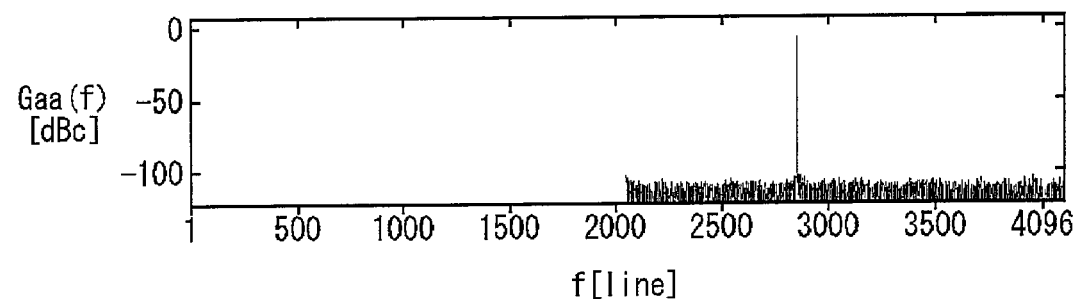
FIG. 3C illustrates the spectrum obtained as a result of eliminating the negative frequency components from the spectrum illustrated in FIG. 3B.

FIG. 3A illustrates an example of the spectrum output from the first frequency domain transforming section 20. The spectrum illustrated in FIG. 3A contains the line spectra of second to thirteenth harmonics of the fundamental component. FIG. 3B illustrates the resultant spectrum obtained by eliminating the line spectra of the harmonics from the spectrum illustrated in FIG. 3A. FIG. 3C illustrates the spectrum obtained as a result of eliminating the negative frequency components from the spectrum illustrated in FIG. 3B. In FIGS. 3A to 5B, fin denotes the fundamental frequency of the input signal, and fs denotes the sampling frequency of the sampling clock. The spectrum in FIG. 3C contains noise components in addition to the fundamental component of the input signal.

As illustrated in FIG. 3A, the fundamental frequency of the input signal is not always positioned at the middle of the frequency range, or the observed band of the spectrum. In other words, the upper sideband which is in higher frequencies than the fundamental frequency and the lower sideband which is in lower frequencies than the fundamental frequency are non-symmetric in the observed band of the spectrum. For this non-symmetric sidebands, the phase noise waveform calculating section 30 can not accurately extract an analytic signal of the discrete waveform output from the AD converter 400 simply by performing the inverse Fourier transform on the resultant spectrum obtained by eliminating the negative frequency components as shown in FIG. 3C.

The technique disclosed in the above-mentioned U.S. Pat. No. 6,525,523 generates an analytic signal by using a filter that passes a predetermined frequency band which is centered around the fundamental frequency of a signal under measurement. This technique, however, can not measure the noise outside the predetermined frequency band of the filter as mentioned earlier.

According to the present embodiment, the spectrum compensating section 40 does not use a band limiting filter, but passes all of the frequency components of the spectrum supplied thereto. Subsequently, to compensate the above-mentioned non-symmetric portion, the spectrum compensating section 40 multiplies the spectrum by a constant number determined in accordance with the non-symmetric portion. In this manner, the measuring apparatus 200 maintains the information about the noise contained in the broad band of the discrete waveform output from the AD converter 400, and accurately generates an analytic signal of the discrete waveform. As a result, the measuring apparatus 200 can accurately measure the jitter generated by the AD converter 400.

The spectrum compensating section 40 may detect a non-symmetric sideband, with reference to the fundamental frequency of the input signal fin. For example, the spectrum compensating section 40 detects the non-symmetric sideband in an unbalanced spectrum, from the upper sideband which is higher in frequency than the fundamental frequency of the input signal fin, in the present example, from fin to fs/2, and the lower sideband which is lower in frequency than the fundamental frequency fin, in the present example, from 0 Hz to fin, in the frequency range of the spectrum, in the present example, from 0 Hz to fs/2. Note that the non-symmetric sideband may be defined herein as follows. The positive frequency range of the spectrum, from 0 Hz to fs/2 in the present example, from the 2049 line to the 4096 line in the exemplary case of the FFT of 4096 points, is centered around the fundamental frequency of the input signal fin, so that the upper and lower sidebands overlap each other. In this case, one of the upper and lower sidebands may have a portion that does not overlap the other. Such a portion may be referred herein to as the non-symmetric sideband. One exemplary method to detect such a non-symmetric sideband is described with reference to FIGS. 4A and 4B.

Figure 4A:
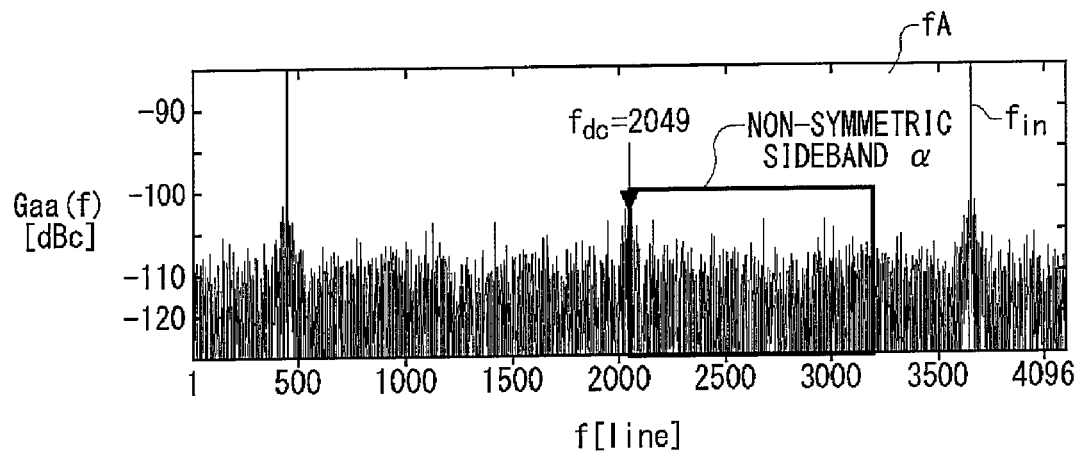
FIG. 4A illustrates an example of the spectrum input into a spectrum compensating section 40.
Figure 4B:
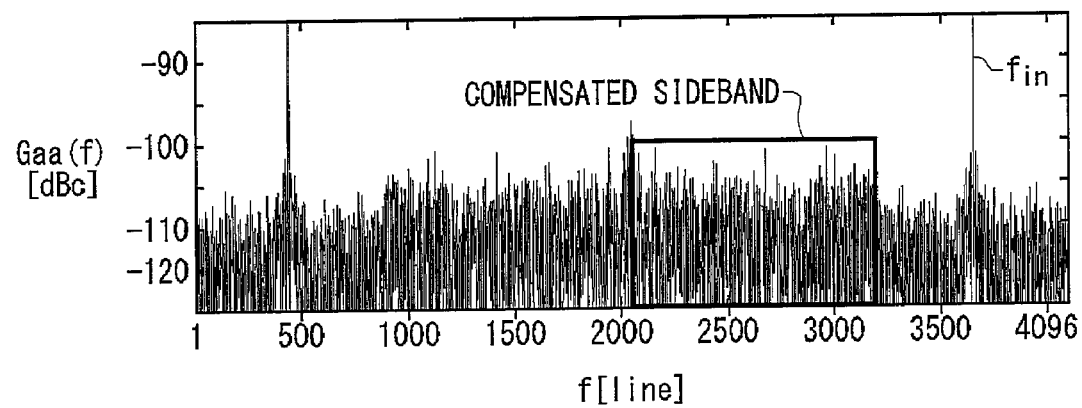
FIG. 4B illustrates an example of the spectrum obtained by the spectrum compensating section 40 by compensating a non-symmetric sideband.

FIG. 4A illustrates an example of the spectrum input into the spectrum compensating section 40. FIG. 4B illustrates an example of the spectrum obtained by the spectrum compensating section 40 by compensating the non-symmetric sideband.

The spectrum compensating section 40 judges whether the fundamental frequency of the input signal fin, in the present example, the 3649 line, is higher than the center frequency of the positive frequency range of the spectrum, in the present example, 4096·3/4=the 3072 line. As illustrated in FIG. 4A, when the fundamental frequency fin is higher than the center frequency, the 3072 line, the above-mentioned non-symmetric sideband is the frequency range, which is lower in frequency than the fundamental frequency fin, from the DC component, in the present example, the 2049 line, to the frequency fA, in the present example, fA=3649−(4096−3649)=the 3202 line.

Figure 5A:
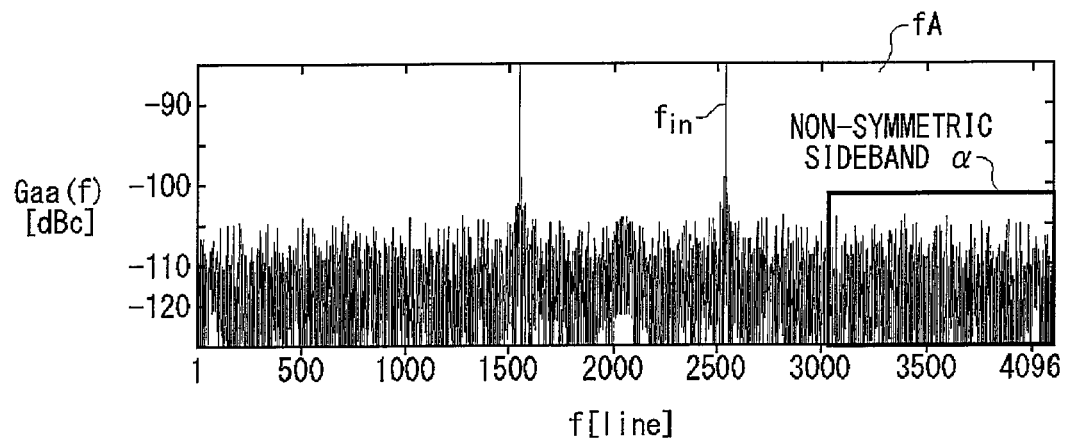
FIG. 5A illustrates another example of the spectrum input into the spectrum compensating section 40.
Figure 5B:
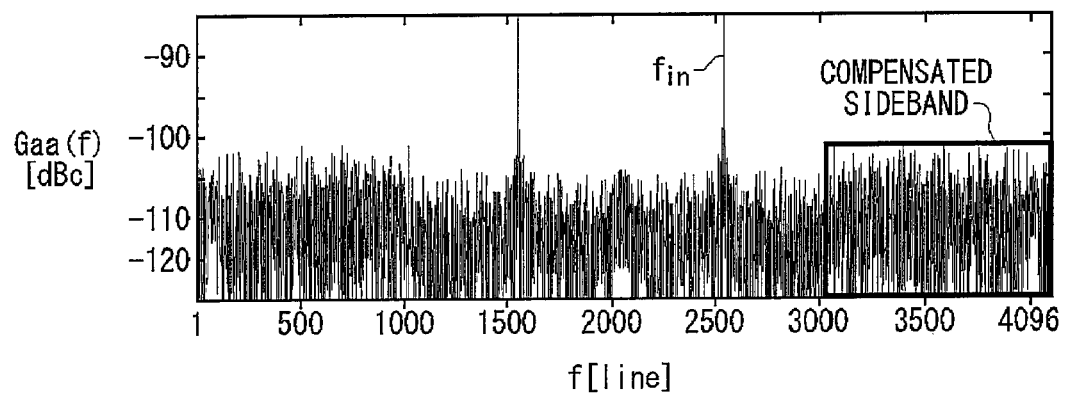
FIG. 5B illustrates an example of the spectrum obtained by compensating a non-symmetric sideband in the spectrum illustrated in FIG. 5A.

FIG. 5A illustrates another example of the spectrum input into the spectrum compensating section 40. FIG. 5B illustrates an example of the spectrum obtained as a result of compensating the non-symmetric sideband of the spectrum illustrated in FIG. 5A.

On the contrary to the spectrum shown in FIG. 4A, the fundamental frequency fin, the 2545 line, is lower than the center frequency, the 3072 line, in the spectrum shown in FIG. 5A. In this case, the non-overlapping portion between the non-symmetric sidebands is the frequency range, which is higher in frequency than the fundamental frequency fin, in the present example, the frequency range from the 3041 line to 4095 line.

The spectrum compensating section 40 may detect the non-overlapping portion between the non-symmetric sidebands by using the technique described above with reference to FIGS. 4A and 5A. The spectrum compensating section 40 may prestore thereon the fundamental frequency of the input signal. The spectrum compensating section 40 may obtain the spectrum of the fundamental frequency by detecting a line spectrum having the largest energy in the spectrum supplied thereto.

The spectrum compensating section 40 compensates the spectrum generated by the first frequency domain transforming section 20 in a manner determined by the detected non-symmetric sideband α. The spectrum compensating section 40 may compensate the non-symmetry of the spectrum by increasing the frequency components in the non-symmetric sideband α.

When the spectrum is a power spectrum, the spectrum compensating section 40 may double the frequency components in the non-symmetric sideband α, as illustrated in FIGS. 4B and 5B. When the spectrum is a complex spectrum, the spectrum compensating section 40 may multiply the frequency components in the non-symmetric sideband α by $\sqrt{2}$. In other words, the spectrum compensating section 40 may compensate the spectrum by doubling the frequency components in the non-symmetric sideband α in power equivalent.

Instead of increasing the frequency components in the non-symmetric sideband α, the spectrum compensating section 40 may compensate the spectrum by decreasing the frequency components outside the non-symmetric sideband α, that is to say, the frequency components in the frequency range from the 3202 line to the 4096 line in the exemplary spectrum of FIG. 4A, the frequency components in the frequency range from the 2049 line to the 3041 line in the exemplary spectrum of FIG. 5A, are decreased by half in power equivalent, that is to say, decreasing the frequency components to half when the spectrum is a power spectrum, and to $1/\sqrt{2}$ when the spectrum is a complex spectrum. In the above-described manner, the spectrum compensating section 40 can compensate the non-symmetric spectrum.

The phase noise waveform calculating section 30 converts the spectrum generated by the compensation done by the spectrum compensating section 40 into a signal in the time domain, and calculates the phase noise waveform in the discrete waveform based on the signal in the time domain obtained by the conversion. For example, the phase noise waveform calculating section 30 may calculate the jitter in the signal under measurement, based on the analytic signal which is obtained by performing the inverse Fourier transform on the spectrum generated by the spectrum compensating section 40. Receiving the spectrum whose non-symmetry has already been compensated by the spectrum compensating section 40, the phase noise waveform calculating section 30 can calculate an accurate analytic signal for the discrete waveform, thereby accurately measuring the phase noise waveform of the discrete waveform. The second frequency domain transforming section 32 transforms the phase noise waveform calculated by the phase noise waveform calculating section 30 into a phase noise spectrum in the frequency domain.

Figure 6A:
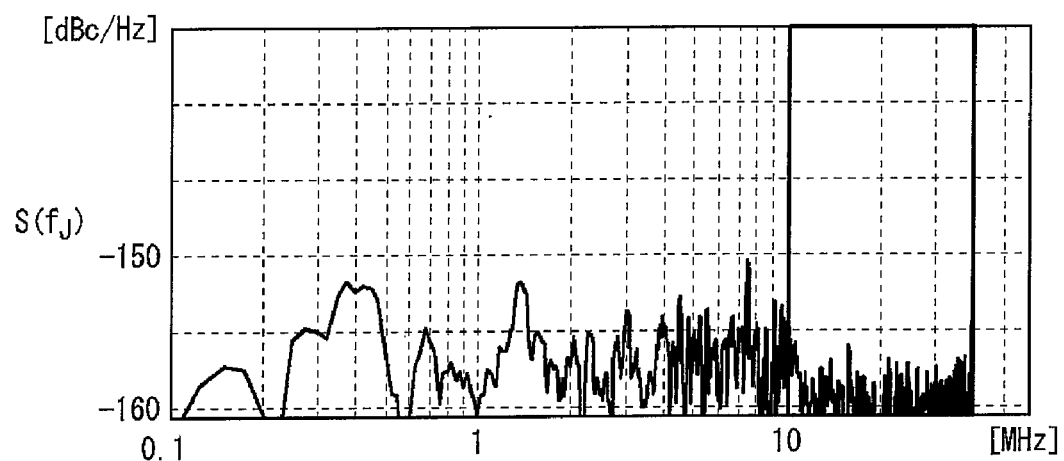
FIG. 6A illustrates an exemplary phase noise spectrum.
Figure 6B:
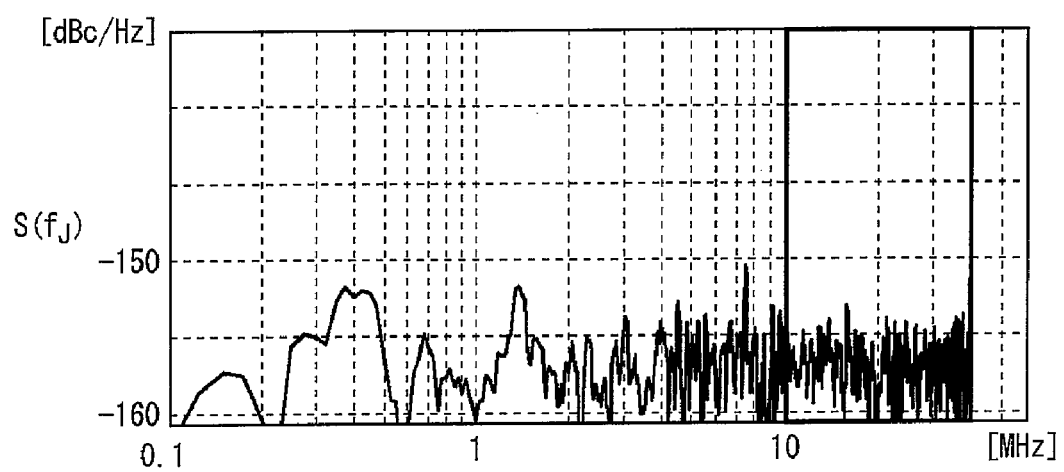
FIG. 6B illustrates an exemplary phase noise spectrum.

FIGS. 6A and 6B illustrate exemplary phase noise spectra. In FIGS. 6A and 6B, the horizontal axis represents the offset frequency from the fundamental frequency of the input signal. FIG. 6A illustrates the spectrum for the phase noise waveform obtained in a case where the spectrum compensating section 40 does not compensate the spectrum of the discrete waveform illustrated in FIG. 4A. In the spectrum shown in FIG. 4A, a part of the lower sideband, −11.15 to 0 MHz, is truncated due to the Nyquist zone, or the observed range, and thus can not be observed. Therefore, a difference of approximately 3 dB is present in the vicinity of 10 MHz in the phase noise spectrum as illustrated in FIG. 6A.

On the other hand, FIG. 6B illustrates the spectrum for the phase noise waveform obtained in a case where the spectrum compensating section 40 compensates the spectrum of the discrete waveform shown in FIG. 4A. As explained in the above, since the spectrum compensating section 40 compensates the non-overlapping portion between the non-symmetric sidebands, the difference seen in FIG. 6A is not present in the phase noise spectrum in FIG. 6B.

With the above-described configurations, the measuring apparatus 200 can obtain an accurate phase noise spectrum. The SNR calculating section 26 calculates the SNR of the discrete waveform output from the AD converter 400, based on the phase noise spectrum generated by the second frequency domain transforming section 32. By referring to the equation 3, the $SNR_T$ is represented by the following equation.

$$SNR_T = 10\log_{10}\frac{1}{(2\pi f_{in}\sigma_{\Delta\phi})^2} \quad \text{Equation 4}$$

$$= 10\log_{10}\frac{1}{\left(\frac{2\pi}{T_{in}}\sigma_{\Delta\phi}\right)^2}$$

$$= 10\log_{10}\frac{1}{2\left[\sum_g G_{\Delta\phi\Delta\phi}(f)\right]}[dB]$$

Here, $T_{in}$ denotes the period of the fundamental, and $G_{\Delta\phi\Delta\phi}(f)$ denotes the phase noise spectrum. The SNR calculating section 26 may calculate the $SNR_T$ by using the equation 4. Which is to say, the SNR calculating section 26 may calculate the SNR based on the value obtained by adding together, or accumulating the individual frequency components within a predetermined frequency range of the phase noise spectrum.

In place of the equation 4, the SNR calculating section 26 may calculate the SNR by means of the following equation.

$$SNR_T = 10\log_{10}\frac{0.5}{\sum_f \frac{G_{\Delta\phi\Delta\phi}(f)}{enbw}}$$

Here, enbw denotes the equivalent noise bandwidth, which may be determined by a window function used by a window function multiplying section 14 described later with reference to FIG. 25. For example, when the window function multiplying section 14 uses the Hanning window function, enbw may be set at 1.5.

The effective bits measuring section 80 measures the $ENOB_T$ of the AD converter 400, based on the $SNR_T$ calculated by the SNR calculating section 26. Generally speaking, the ENOB is represented by the following equation 5 based on the SNR. The equation 5 is transformed in the following manner by using the equation 3.

$$ENOB_T = \frac{SNR_T - 1.76}{6.02}$$
$$= -3.32\log_{10}f_{in} - 3.32\log_{10}\sigma_{\Delta\phi} - 2.94$$

Equation 5

When the aliasing effects due to the Nyquist frequency are taken into consideration, the equation 5 is transformed as shown below.

$$ENOB_T \propto \begin{cases} -3.32\log_{10}f_{in} - 3.32\log_{10}\sigma_{\Delta\phi} & f_{in} < f_{Nyq} \\ +3.32(\log_{10}f_{in} - 2\log_{10}f_{Nyq}) - 3.32\log_{10}\sigma_{\Delta\phi} & f_{Nyq} < f_{in} < \beta f_{Nyq} \\ -3.32(\log_{10}f_{in} - 2\log_{10}\beta) - 3.32\log_{10}\sigma_{\Delta\phi} & \beta f_{Nyq} < f_{in} \end{cases}$$

Equation 6

Here, $f_{Nyq}$ denotes the Nyquist frequency fs/2.

The effective bits measuring section 80 may measure the $ENOB_T$ by using one of the equations 5 and 6. The $ENOB_T$ takes a local maximal value when the fundamental frequency of the input signal fin falls in a range from $f_{Nyq}$ to $2f_{Nyq}$. In other words, the equation 6 provides the best-case value of the ENOB. The worst-case value of the ENOB is given by the following equation.

$$ENOB_T \propto -3.32\log_{10}f_{in} - 3.32\log_{10}\sigma_{\Delta\phi}$$ Equation 7

Figure 7:
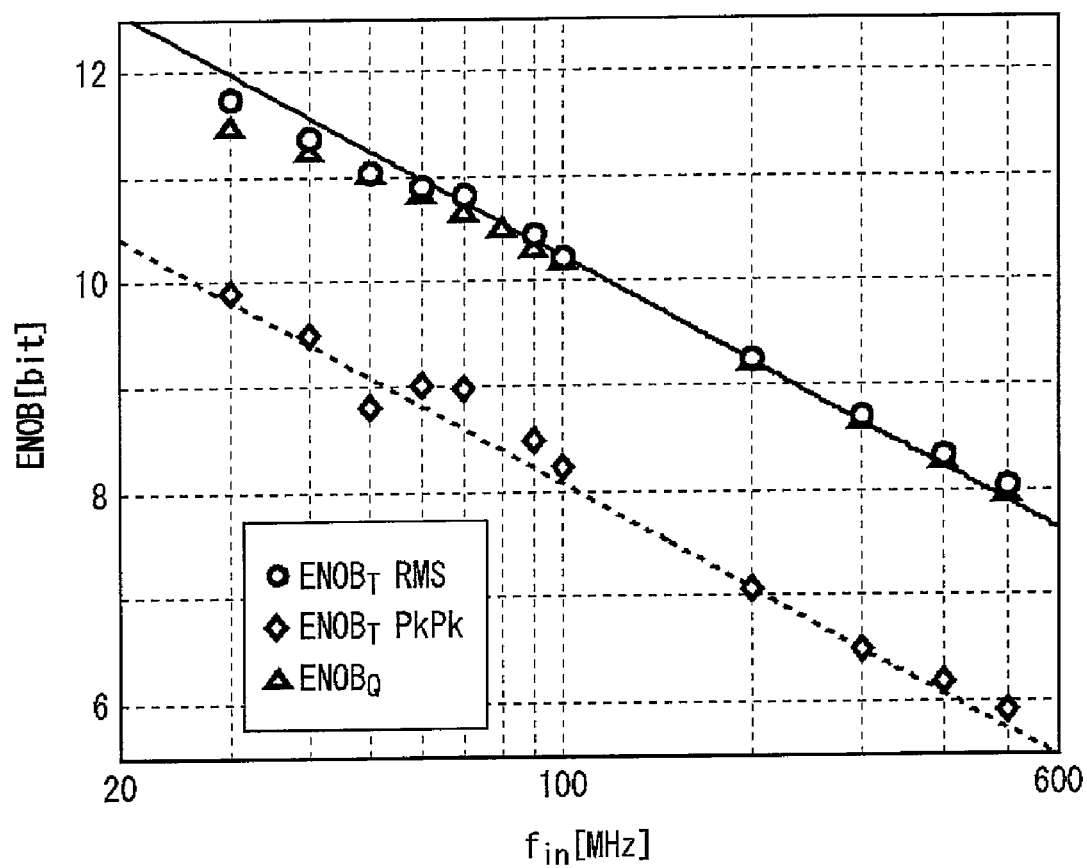
FIG. 7 illustrates an $ENOB_Q$ measured by using a conventional method and an $ENOB_T$ measured by using the measuring apparatus 200.
Figure 8:
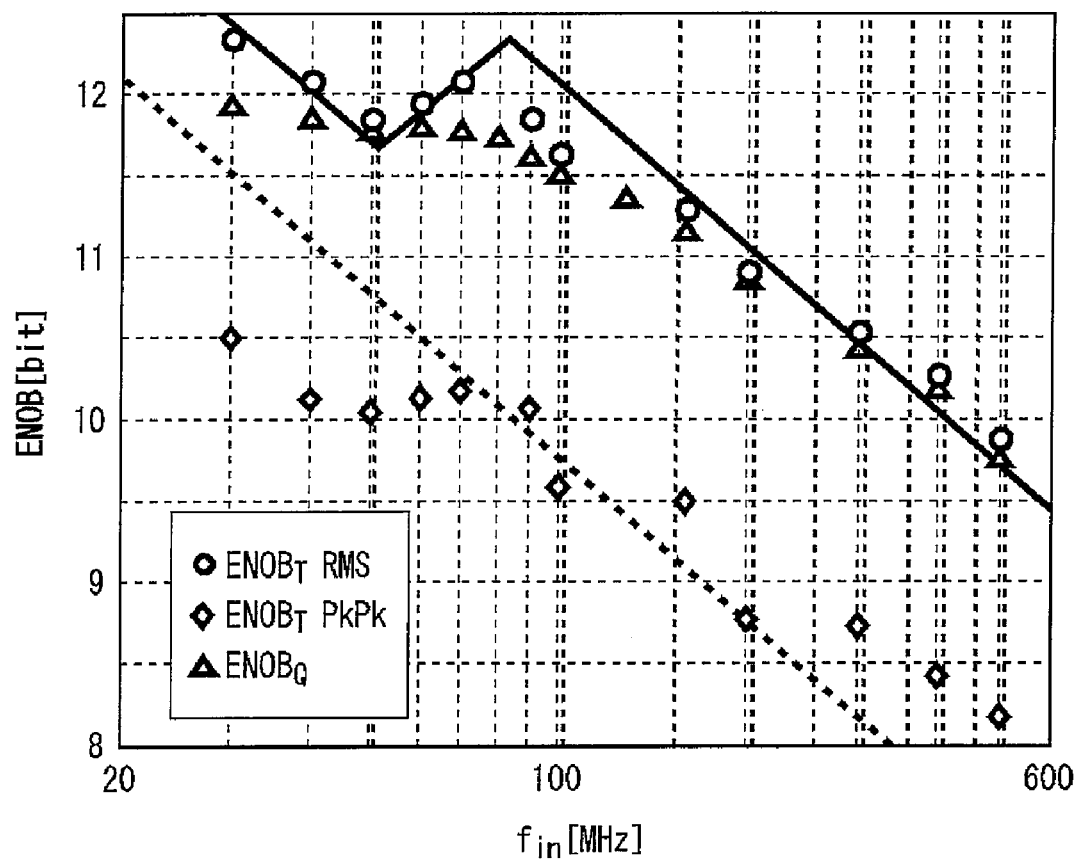
FIG. 8 illustrates the $ENOB_Q$ measured by using the conventional method and the $ENOB_T$ measured by using the measuring apparatus 200.

FIGS. 7 and 8 each illustrate the $ENOB_Q$ measured by using a conventional method and the $ENOB_{T,RMS}$ measured by using the measuring apparatus 200. Here, FIG. 7 illustrates the measurement results obtained when the AD converter 400 generates large aperture jitter. FIG. 8 illustrates the measurement results obtained when the AD converter 400 generates small aperture jitter. Specifically speaking, the measurement results shown in FIG. 7 are obtained by measuring the ENOB under the condition that the amount of the aperture jitter is degraded by varying the amplitude of the sampling clock approximately tenfold without varying the frequency of the sampling clock, when compared to the amplitude and frequency used for obtaining the measurement results shown in FIG. 8. In FIGS. 7 and 8, the horizontal axis logarithmically represents the fundamental frequency of the input signal fin.

In a case where the aperture jitter is large and the quantization noise thus has relatively low influence as shown in FIG. 7, the measurement results obtained by using the conventional method are substantially the same as the measurement results obtained by using the measuring apparatus 200. Which is to say, the measurement results shown in FIG. 7 verify that the measuring apparatus 200 can accurately measure the ENOB when the aperture jitter is large.

In a case where the aperture jitter is relatively small as shown in FIG. 8, the $ENOB_Q$ and the $ENOB_{T,RMS}$ are substantially the same in the region of fin>100 MHz in which the aperture jitter is dominant. In the region of fin<100 MHz in which the quantization noise is dominant, the $ENOB_Q$ remains at a substantially constant value but the $ENOB_{T,RMS}$ linearly varies in accordance with the variation in the logarithmic frequency. This linear change corresponds to the equation 5. Which is to say, the measuring apparatus 200 has been verified to be capable of accurately measuring the $ENOB_{T,RMS}$.

As is apparent from FIG. 8, the measurement results of the ENOB which are obtained when small aperture jitter is generated favorably correspond to the equation 6. Here, FIG. 8 shows the theoretical values obtained by the equation 6 by using the straight lines. This means that the equation 6 has been verified to provide the best-case value of the ENOB. Also, as is apparent from FIG. 7, the measurement results of the ENOB which are obtained when large aperture jitter is generated favorably correspond to the equation 7. This means that the equation 7 has been verified to provide the worst-case value of the ENOB.

The effective bits measuring section 80 may calculate the best-case value of the ENOB by using the equation 6. The effective bits measuring section 80 may calculate the worst-case value of the ENOB by using the equation 7. Note that the equations 6 and 7 represent a proportional relation. Hence, once the ENOB is measured in association with a single frequency, the measured value of the ENOB and the equations 6 and 7 can provide the best and worst-case values of the ENOB in association with the entire band.

Based on a phase noise spectrum obtained in association with an input signal having a predetermined frequency, the effective bits measuring section 80 may calculate at least one of the best and worst-case values of the ENOB observed when the AD converter receives an input signal having a frequency different from the predetermined frequency. The effective bits measuring section 80 may calculate the best and worst-case values of the ENOB in association with a predetermined band.

The reference signal generating section 16 may input, into the AD converter 400, the input signal having a frequency lower than the Nyquist frequency of the sampling clock, fs/2. Even in this case, the effective bits measuring section 80 can calculate the best and worst-case values of the ENOB observed when the AD converter 400 receives the input signal having a frequency higher than the Nyquist frequency, for example. As a result, the measuring apparatus 200 can measure the ENOB of the AD converter 400 in association with a predetermined band, by using the reference signal generating section 16 which is configured by using a relatively low-performance and low-cost element.

Figure 9:
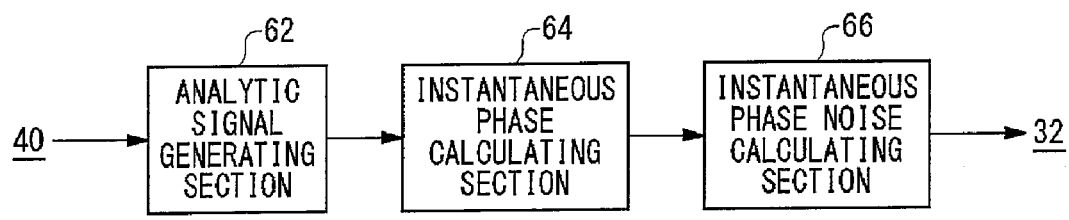
FIG. 9 illustrates an exemplary configuration of the phase noise waveform calculating section 30.

FIG. 9 illustrates an exemplary configuration of the phase noise waveform calculating section 30. The phase noise waveform calculating section 30 includes therein an analytic signal generating section 62, an instantaneous phase calculating section 64, and an instantaneous phase noise calculating section 66.

Figure 10:
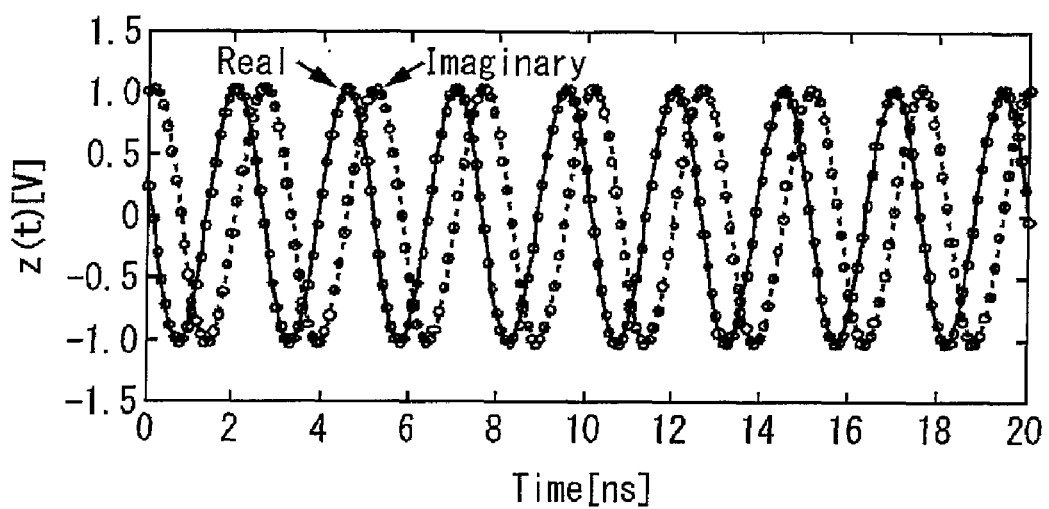
FIG. 10 illustrates an example of an analytic signal generated by an analytic signal generating section 62.

FIG. 10 illustrates an example of the analytic signal generated by the analytic signal generating section 62. The analytic signal generating section 62 performs the inverse Fourier transform on the spectrum generated by the spectrum compensating section 40, to generate an analytic signal in the time domain. The analytic signal may be the waveform of the signal under measurement as the real part thereof, and the waveform obtained by 90-degree phase shifting the signal under measurement as the imaginary part thereof, for example. The analytic signal may be obtained in such a manner that the resultant spectrum obtained by eliminating the negative frequency components as shown in FIG. 3C is supplied to the spectrum compensating section 40, the spectrum compensating section 40 compensates the non-symmetric sideband, and the spectrum generated by the compensation is subjected to the inverse Fourier transform by the analytic signal generating section 62.

Figure 11:
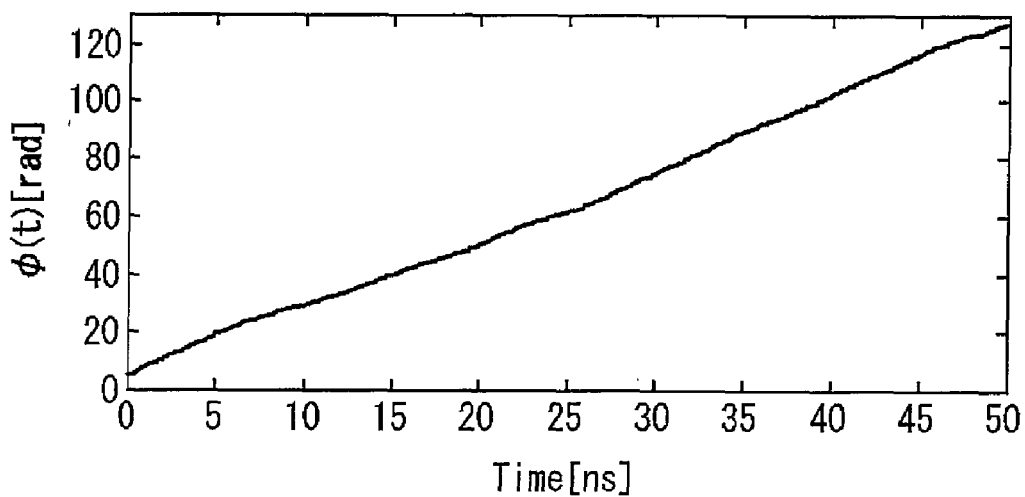
FIG. 11 illustrates an example of the instantaneous phase calculated by an instantaneous phase calculating section 64.

FIG. 11 illustrates an example of the instantaneous phase calculated by the instantaneous phase calculating section 64. The instantaneous phase calculating section 64 calculates the instantaneous phase of the signal under measurement based on the analytic signal calculated by the analytic signal generating section 62. For example, the instantaneous phase calculating section 64 may calculate the instantaneous phase of the signal under measurement by obtaining the arctangent of the real and imaginary parts of the analytic signal.

Here, the function indicating the instantaneous phase which is obtained by calculating the arctangent of the real and imaginary parts of the analytic signal is expressed by the principal values in the range from $-\pi$ to $\pi$, for example. In other words, the function of the instantaneous phase is a discontinuous function in which a value $\pi$ shows discontinuity followed by a value $-\pi$. In this case, the instantaneous phase calculating section 64 may unwrap the instantaneous phase by sequentially adding the value $2\pi$ to the instantaneous phase at the points of discontinuity, for example, thereby calculating a continuous instantaneous phase as illustrated in FIG. 11.

Figure 12:
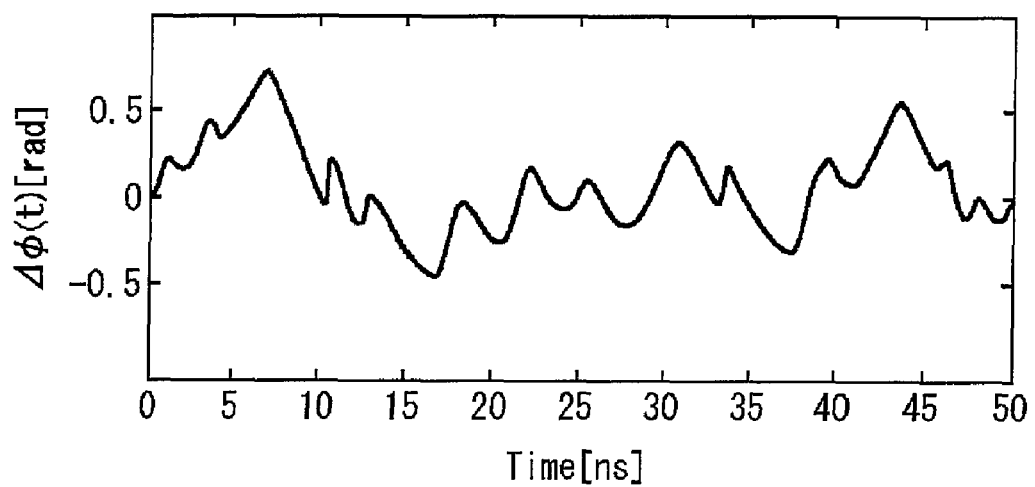
FIG. 12 illustrates an example of the instantaneous phase noise calculated by an instantaneous phase noise calculating section 66.

FIG. 12 illustrates an example of the instantaneous phase noise calculated by the instantaneous phase noise calculating section 66. The instantaneous phase noise calculating section 66 calculates the instantaneous phase noise of the signal under measurement based on the instantaneous phase calculated by the instantaneous phase calculating section 64. For example, the instantaneous phase noise calculating section 66 may calculate the instantaneous phase noise by eliminating a linear component from the instantaneous phase. The instantaneous phase noise calculating section 66 may calculate the linear component by approximating the instantaneous phase with a straight line based on, for example, the least square method.

According to the above-described processing, each value of the instantaneous phase noise is expressed in unit of radian. The instantaneous phase noise calculating section 66 may convert the instantaneous phase noise expressed in unit of radian into the instantaneous phase noise expressed in time, based on the fundamental frequency of the signal under measurement. For example, the instantaneous phase noise calculating section 66 may calculate the instantaneous phase noise in time by dividing the instantaneous phase noise $\Delta\phi(t)$ expressed in unit of radian by $2\pi fin$. The instantaneous phase noise calculating section 66 may supply the calculated instantaneous phase noise to the second frequency domain transforming section 32.

The phase noise waveform calculating section 30 can also calculate the jitter of the signal under measurement, based on the instantaneous phase noise calculated by the instantaneous phase noise calculating section 66. For example, the phase noise waveform calculating section 30 can obtain the timing jitter sequence of the input signal by sampling the value of the instantaneous phase noise at the timing of each rising edge of the input signal.

Figure 13A:
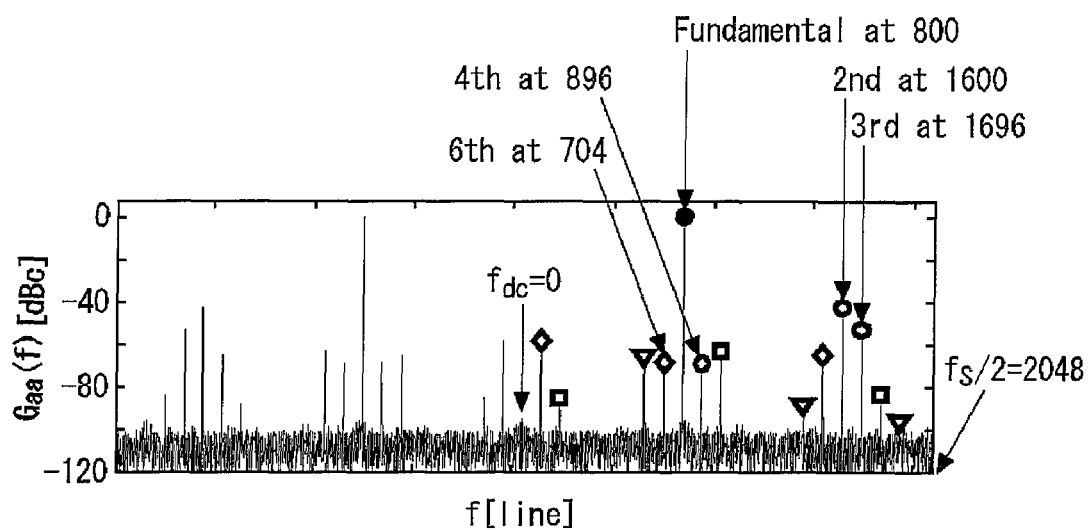
FIG. 13A illustrates another example of the spectrum output from the first frequency domain transforming section 20.
Figure 13B:
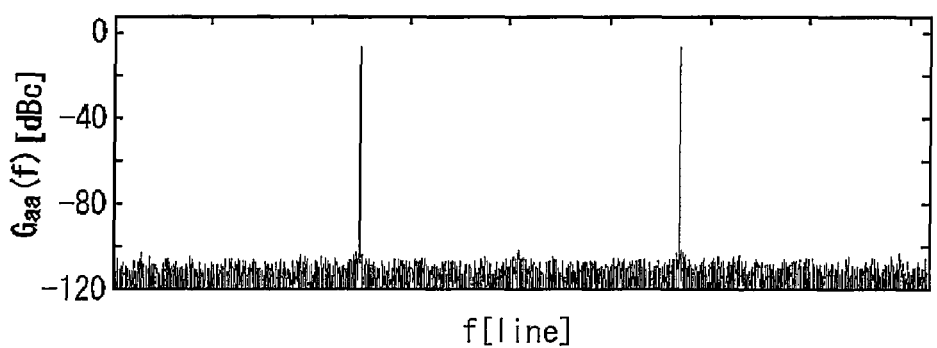
FIG. 13B illustrates an example of the spectrum obtained as a result of eliminating the harmonic components from the spectrum.

FIG. 13A illustrates another example of the spectrum output from the first frequency domain transforming section 20. As illustrated in FIG. 13A, the spectrum of the discrete waveform has the harmonic components of the fundamental at fin, at the following frequencies: f2, f3, f4, . . . . The spectrum compensating section 40 may eliminate the harmonic components before or after the compensation of the non-symmetric sideband described with reference to FIGS. 4A to 5B. FIG. 13B illustrates an example of the resultant spectrum obtained by eliminating the harmonic components.

The harmonic components are present at the frequencies equal to the integral multiples of the fundamental frequency fin. Note that, however, some of the harmonic components associated with the frequencies outside the frequency range of the spectrum, in the present example, the frequency range from 0 to fs/2, are folded at the frequencies of the borders defining the frequency range, in the present example, 0 and the Nyquist frequency of fs/2, so as to be present within the frequency range. The spectrum compensating section 40 may detect the harmonic components to be eliminated, based on the number of sample points for the Fourier transform, in the present example, 4096 sample points, and the fundamental frequency of the input signal fin.

The following describes an exemplary method to detect the harmonic components, with reference to FIG. 13A. To begin with, the spectrum compensating section 40 detects the second-order harmonic component. Here, the second-order harmonic component is originally expected to appear at the frequency of 2fin, in the present example, 2fin=1600. Therefore, the spectrum compensating section 40 may judge whether the frequency 2fin falls within the frequency range of the spectrum. When the frequency 2fin falls within the frequency range of the spectrum, in the present example, 0<f<2048, the spectrum compensating section 40 eliminates the component at the frequency 2fin, as the second-order harmonic component. Here, eliminating a frequency component may indicate that the level of the frequency component is changed to zero.

When the frequency 2fin does not fall within the frequency range, not shown in FIG. 13A, the spectrum compensating section 40 calculates the frequency f2_folded which is obtained by folding the frequency 2fin with respect to the frequency fs/2. Here, the frequency f2_folded may be expressed as fs/2+(fs/2−2fin).

Subsequently, the spectrum compensating section 40 detects the third-order harmonic component based on the fundamental frequency of the input signal fin. The third-order harmonic component appears at the frequency of f3, in the present example, f3=2400. Similarly to the case of the second-order harmonic component, the spectrum compensating section 40 judges whether the frequency associated with the third-order harmonic component falls within the frequency range. In the present example, the frequency f3 of the third-order harmonic component is outside the frequency range. Therefore, the spectrum compensating section 40 calculates the frequency f3_folded, in the present example, 1696=2048−(2400−2048), which is obtained when folding the frequency f3 with respect to the frequency fs/2. Here, the frequency f3_folded falls within the frequency range. Hence, the spectrum compensating section 40 changes the level of the frequency component at the frequency f3_folded to zero.

Subsequently, the spectrum compensating section 40 detects the fourth-order harmonic component based on the fundamental frequency of the input signal fin. In the present example, the fourth-order harmonic component appears at the frequency of f4, in the present example, f4=3200. Similarly to the case of the third-order harmonic component, the spectrum compensating section 40 judges whether the frequency associated with the fourth-order harmonic component falls within the frequency range. In the present example, the frequency f4 of the fourth-order harmonic component is outside the frequency range. Therefore, the spectrum compensating section 40 calculates the frequency f4_folded, in the present example, f4_folded=896, which is obtained when folding the frequency f4 with respect to the frequency fs/2.

In the present example, the frequency f6 associated with the sixth-order harmonic component, in the present example, f6=4800, is outside the frequency range. Therefore, the spectrum compensating section 40 calculates the frequency f6_folded, in the present example, f6_folded=−704, which is obtained when folding the frequency f6 with respect to the frequency fs/2. Since the calculated frequency f6_folded is a negative value, the spectrum compensating section 40 calculates the frequency f6_folded2 which is obtained by further folding the frequency f6_folded with respect to the frequency 0. The spectrum compensating section 40 then changes the level of the frequency component at the frequency f6_folded2 to zero.

By repeatedly performing the above processing, the spectrum compensating section 40 can eliminate the harmonic components from the spectrum, so that the spectrum is left with the fundamental wave component and the random noise component. Therefore, the measuring apparatus 200 can accurately measure the aperture jitter generated by the AD converter 400. Here, the highest order of the harmonic components to be eliminated by the spectrum compensating section 40 may be determined in advance. The spectrum compensating section 40 may eliminate the harmonic components whose levels are equal to or higher than a predetermined level.

The clock generating section 10 may generate the sampling clock whose sampling frequency fs is coherent with the fundamental frequency fin. With this condition being satisfied, the harmonic components appear as line spectra in the spectrum. As a result, the measuring apparatus 200 can minimize the amount of operations required to be performed to eliminate the harmonic components.

Figure 14:
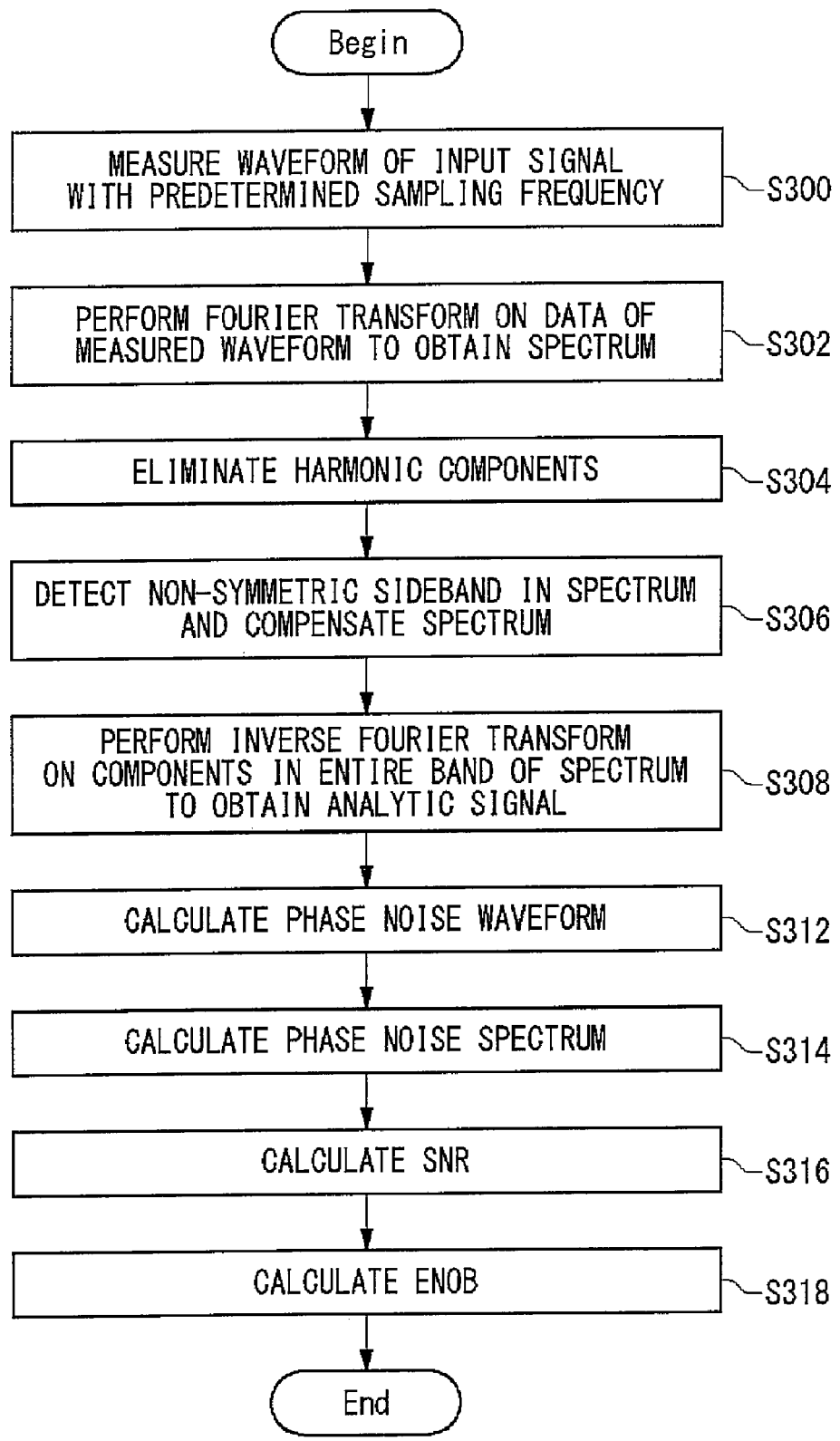
FIG. 14 is a flow chart illustrating an exemplary operation of the measuring apparatus 200 described with reference to FIGS. 2 to 13B.

FIG. 14 is a flowchart illustrating an exemplary operation of the measuring apparatus 200 described with reference to FIGS. 2 to 13B. As described earlier, the AD converter 400 measures the waveform of the input signal with the predetermined sampling frequency in the step S300. Subsequently, the first frequency domain transforming section 20 performs the Fourier transform on the discrete waveform data output from the AD converter 400, to obtain the spectrum in the step S302.

After this, the spectrum compensating section 40 eliminates the harmonic components of the fundamental in the input signal from the spectrum in the step S304. After eliminating the harmonic components, the spectrum compensating section 40 detects the non-symmetric frequency range in the spectrum, and compensates the spectrum in the manner determined by the detected non-symmetric frequency components in the step S306. In the step S306, alternatively, the spectrum compensating section 40 may eliminate the harmonic components after compensating the spectrum in the manner determined by the detected non-symmetric frequency components.

Following this, the phase noise waveform calculating section 30 performs the inverse Fourier transform on the components in the entire band of the spectrum output from the spectrum compensating section 40, to generate the analytic signal for the discrete waveform in the step S308. The phase noise waveform calculating section 30 calculates the phase noise waveform of the discrete waveform based on the generated analytic signal in the step S312.

The second frequency domain transforming section 32 performs the Fourier transform on the phase noise waveform of the discrete waveform, to calculate the phase noise spectrum in the step S314. Subsequently, the SNR calculating section 26 calculates the SNR by using the phase noise spectrum in the step S316. The effective bits measuring section 80 then measures the ENOB based on the SNR in the step S318.

Figure 15:
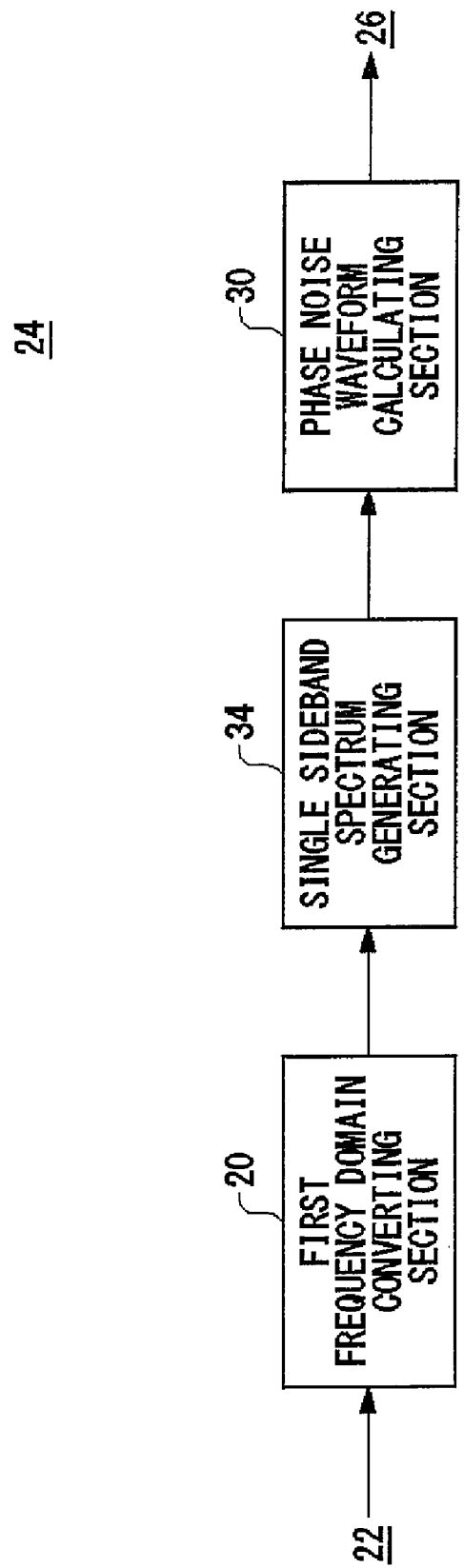
FIG. 15 illustrates another exemplary configuration of the data processing section 24.

FIG. 15 illustrates another exemplary configuration of the data processing section 24. According to the present example, the data processing section 24 supplies the phase noise of the discrete waveform output from the AD converter 400, that is to say, the data in the time domain, to the SNR calculating section 26. In the present example, the data processing section 24 includes therein the first frequency domain transforming section 20, a single sideband spectrum generating section 34, and the phase noise waveform calculating section 30.

The first frequency domain transforming section 20 may be the same as the first frequency domain transforming section 20 described with reference to FIG. 2. The single sideband spectrum generating section 34 receives the spectrum of the discrete waveform which is generated by the first frequency domain transforming section 20, and generates a single sideband spectrum based on the received spectrum. The operation of the single sideband spectrum generating section 34 will be described later with reference to FIGS. 16 and 17.

The phase noise waveform calculating section 30 calculates the phase noise waveform in the discrete waveform output from the AD converter 400 based on the single sideband spectrum generated by the single sideband spectrum generating section 34. The phase noise waveform calculating section 30 may have the same functions and configurations as the phase noise waveform calculating section 30 described with reference to FIG. 2.

For example, the phase noise waveform calculating section 30 may perform the inverse Fourier transform on the single sideband spectrum. Since the single sideband spectrum does not contain the negative frequency components, the phase noise waveform calculating section 30 can obtain the analytic signal of the discrete waveform by performing the inverse Fourier transform on the single sideband spectrum. The phase noise waveform calculating section 30 may calculate the phase noise waveform in the time domain $\Delta\phi(t)$ based on the analytic signal, in the manner described with reference to FIG. 9.

Figure 16:
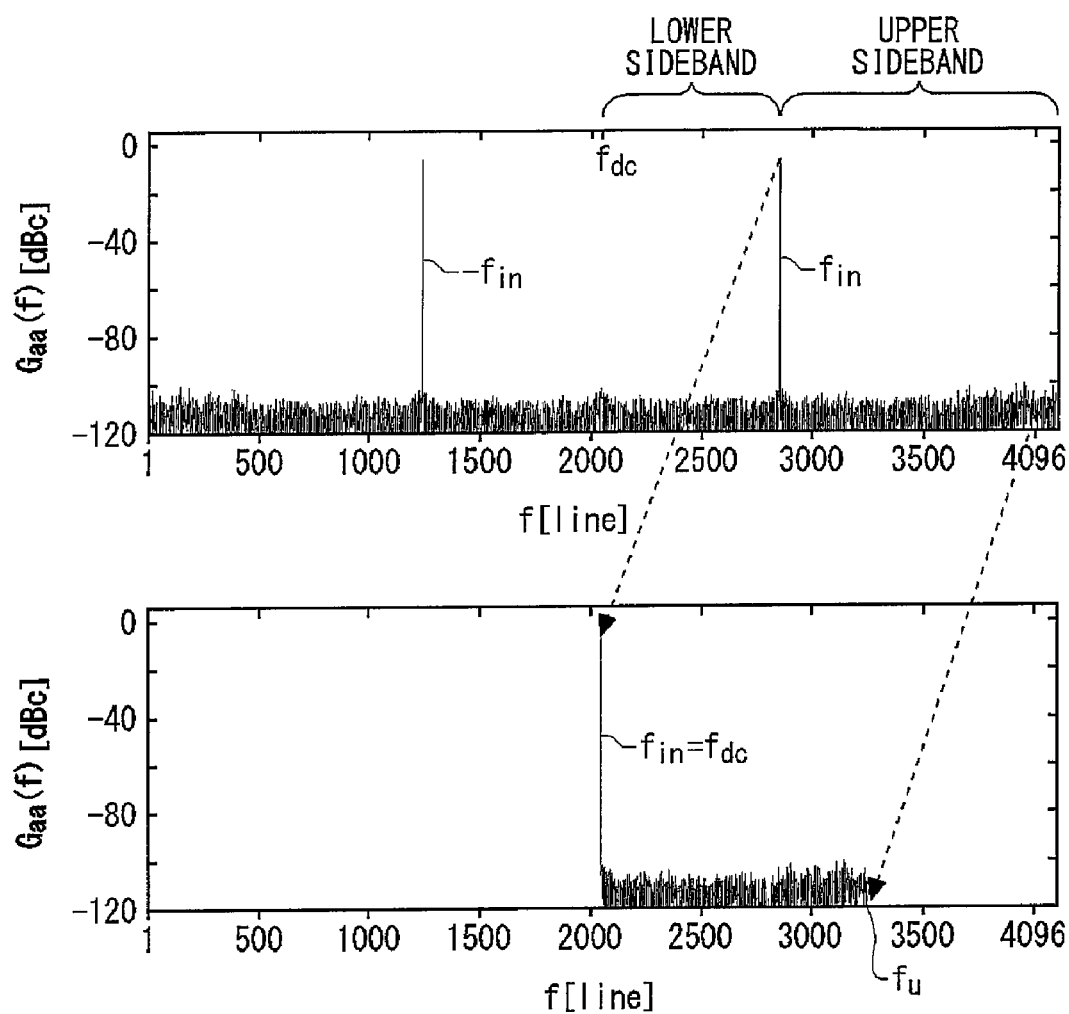
FIG. 16 illustrates an example of the spectrum supplied to a single sideband spectrum generating section 34 and an example of the single sideband spectrum generated by the single sideband spectrum generating section 34.

FIG. 16 illustrates an example of the input spectrum supplied to the single sideband spectrum generating section 34 and an example of the single sideband spectrum generated by the single sideband spectrum generating section 34. The upper spectrum in FIG. 16 is the input spectrum supplied to the single sideband spectrum generating section 34, and the lower spectrum in FIG. 16 is the single sideband spectrum generated by the single sideband spectrum generating section 34.

The single sideband spectrum generating section 34 may detect an upper sideband which is higher in frequency than the fundamental frequency of the input signal fin and a lower sideband which is lower in frequency than the fundamental frequency of the input signal fin in the positive frequency range of the input spectrum supplied thereto, that is to say, the upper spectrum in FIG. 16. Subsequently, the single sideband spectrum generating section 34 generates the single sideband spectrum, that is to say, the lower spectrum in FIG. 16, whose sideband is equivalent to one of the detected upper and lower sidebands. Since the single sideband spectrum generating section 34 generates the above-described single sideband spectrum, the phase noise waveform calculating section 30 can generate an accurate phase noise waveform even when the upper and lower sidebands are asymmetrical in the spectrum of the discrete waveform.

Here, the single sideband spectrum generating section 34 preferably selects one of the upper and lower sidebands which has a larger bandwidth, for the sideband of the single sideband spectrum to be generated. With this condition being satisfied, the phase noise waveform calculated by the phase noise waveform calculating section 30 can contain a noise component associated with a wide band.

In the example shown in FIG. 16, the upper sideband has a larger bandwidth than the lower sideband. Therefore, the single sideband spectrum generating section 34 selects the upper sideband of the spectrum supplied thereto as the sideband of the single sideband spectrum. In this case, the single sideband spectrum generating section 34 generates the single sideband spectrum by shifting the frequency component at the fundamental frequency fin and the frequency components within the upper sideband in the spectrum of the discrete waveform, that is to say, the upper spectrum in FIG. 16, in such a manner that the frequency component at the fundamental frequency fin is positioned as the dc component of the single sideband spectrum, that is to say, the lower spectrum in FIG. 16. Here, the single sideband spectrum generating section 34 may set the levels of the frequency components other than the fundamental at frequency fin and the frequency components being contained in the upper sideband, as zero.

Which is to say, the single sideband spectrum generating section 34 may shift the fundamental and the frequency components within the upper sideband in the received spectrum, so that the shifted frequency components are positioned at dc and its single sideband, with keeping the normal ascending order, or without changing the order, of the frequency components in the frequency axis. The single sideband spectrum generating section 34 may generate the single sideband spectrum Sa(f) from the spectrum Sin(f) supplied thereto by referring to the following equation.

$$S_a(f) = \begin{cases} S_{in}(f - f_{in}) & 0 \le f \le f_u \\ 0 & f < 0, f > f_u \end{cases} \quad \text{Equation 8}$$

Here, $f_u$ denotes the bandwidth of the upper sideband.

Figure 17:
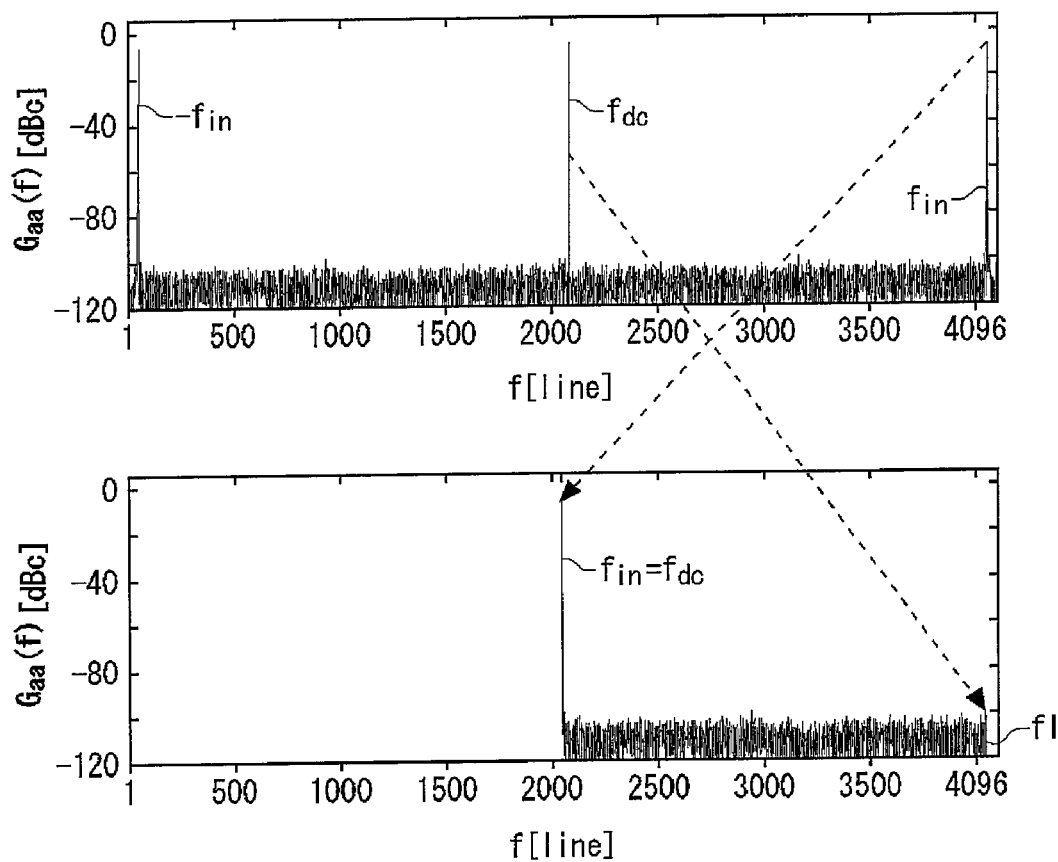
FIG. 17 illustrates another example of the spectrum supplied to the single sideband spectrum generating section 34, and another example of the single sideband spectrum generated by the single sideband spectrum generating section 34.

FIG. 17 illustrates another example of the spectrum supplied to the single sideband spectrum generating section 34, and another example of the single sideband spectrum generated by the single sideband spectrum generating section 34. According to the present example, the lower sideband has a larger bandwidth than the upper sideband in the received spectrum, that is to say, the upper spectrum in FIG. 17. Therefore, the single sideband spectrum generating section 34 selects the lower sideband of the received spectrum for the sideband of the single sideband spectrum.

In the example shown in FIG. 17, the single sideband spectrum generating section 34 reverses the order, in the frequency axis, of the frequency component at the fundamental frequency fin and the frequency components within the lower sideband in the spectrum of the discrete waveform, that is to say, the upper spectrum in FIG. 17. Subsequently, the single sideband spectrum generating section 34 generates the single sideband spectrum, that is to say, the lower spectrum in FIG. 17, by shifting the frequency component at the fundamental frequency fin and the frequency components in the lower sideband, which are in the reversed order, in such a manner that the frequency component at the fundamental frequency fin is positioned as the frequency component at dc fdc in the single sideband spectrum. Here, the single sideband spectrum generating section 34 may set the levels of the frequency components other than the frequency component at the fundamental frequency fin and the frequency components corresponding to the frequencies within the lower sideband, as zero.

Which is to say, the single sideband spectrum generating section 34 may shift the fundamental and the frequency components within the lower sideband in the received spectrum, so that the shifted frequency components are positioned at dc and its single sideband, in the descending order, or with reversing the order, of the frequency components in the frequency axis. The single sideband spectrum generating section 34 may generate the single sideband spectrum Sa(f) from the spectrum Sin(f) supplied thereto, by referring to the following equation.

$$S_a(f) = \begin{cases} S_{in}(-[f - f_{in}]) & 0 \le f \le f_l \\ 0 & f < 0, f > f_l \end{cases} \quad \text{Equation 9}$$

Here, $f_l$ denotes the bandwidth of the lower sideband.

By performing the processing described with reference to FIGS. 16 and 17, the single sideband spectrum generating section 34 can produce a broadband single sideband spectrum. Hence, the phase noise waveform calculating section 30 can generate the analytic signal of the discrete waveform by performing the inverse Fourier transform on the single sideband spectrum, with keeping the noise information in a wide band.

According to the exemplary processing described with reference to FIGS. 16 and 17, the single sideband spectrum generating section 34 shifts the frequency component at the positive fundamental frequency fin and the frequency components within one of the sidebands such that the frequency component at the positive fundamental frequency fin is positioned as the dc component fdc. According to different exemplary processing, however, the single sideband spectrum generating section 34 may shift the frequency component at the negative fundamental frequency −fin and the frequency components within one of the sidebands such that the frequency component at the negative fundamental frequency −fin is positioned as the dc component fdc.

The single sideband spectrum generating section 34 may eliminate the harmonic components in the single sideband spectrum by performing the processing which is performed by the spectrum compensating section 40 as described with reference to FIGS. 13A and 13B. For example, the single sideband spectrum generating section 34 may first eliminate the line spectra of the harmonic components contained in the spectrum supplied thereto, and then generate the single sideband spectrum by performing the processing described with reference to FIGS. 16 and 17. Alternatively, the single sideband spectrum generating section 34 may first generate the single sideband spectrum, and then eliminate the line spectra of the harmonic components contained in the single sideband spectrum. In this manner, the measuring apparatus 200 relating to the present example can accurately measure the random noise component.

The data processing section 24 described with reference to FIG. 15 can obtain an accurate phase noise waveform in the time domain. Which is to say, in order that an accurate phase noise waveform is obtained from the spectrum of the discrete waveform, the upper and lower sidebands need to have the same bandwidth in the spectrum when observed. As indicated by FIGS. 4A, 5A, 16, 17 and other drawings, however, the upper and lower sidebands rarely have the same bandwidth, or the fundamental frequency is hardly positioned in the middle of the observed range.

Furthermore, the single sideband spectrum generating section 34 may compensate the non-symmetric sideband in the single sideband spectrum by performing the processing which is performed by the spectrum compensating section 40 as described with reference to the step S306 in FIG. 14. For example, the single sideband spectrum generating section 34 first doubles the individual frequency components in the input spectrum supplied thereto in power equivalent, specifically, when the input spectrum is a complex spectrum, the single sideband spectrum generating section 34 multiples the frequency components by √2 in power equivalent, and then convert the compensated spectrum into the single sideband spectrum. Alternatively, the single sideband spectrum generating section 34 may first generate the single sideband spectrum from the input spectrum, and then double the individual frequency components in the single sideband spectrum in power equivalent.

With the above-described configurations, the data processing section 24 described with reference to FIG. 15 can generate the single sideband spectrum whose dc component is shifted from the fundamental component in the spectrum which is obtained as a result of compensating the non-symmetric sideband, and use the generated single sideband spectrum for calculating the phase noise waveform. Consequently, the data processing section 24 can calculate an accurate phase noise waveform.

When the data processing section 24 has the functions and configurations described with reference to FIG. 15, the SNR calculating section 26 calculates the SNR for the discrete waveform based on the phase noise waveform in the time domain which has been calculated by the data processing section 24. For example, the SNR calculating section 26 may calculate the SNR based on the time-domain values obtained from the phase noise waveform in the time domain, such as the RMS value and the peak-to-peak value.

Figure 18A:
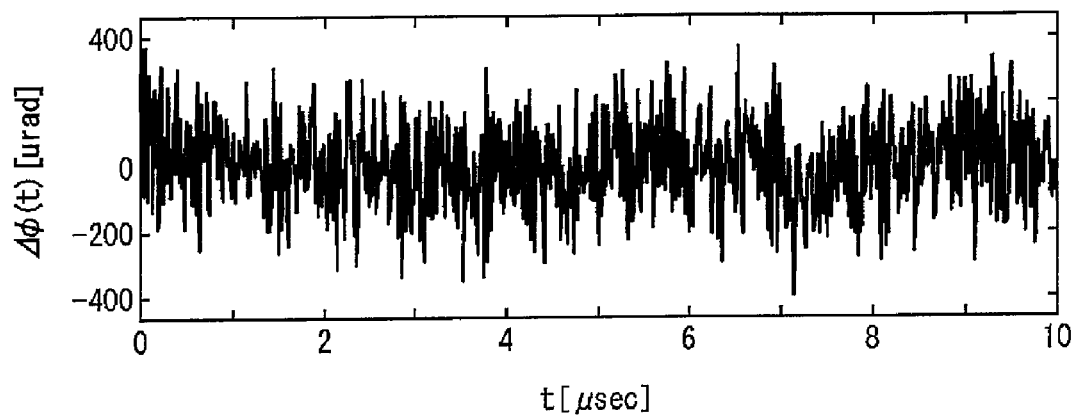
FIG. 18A illustrates the phase noise waveform in the time domain which is calculated from the single sideband spectrum illustrated in FIG. 16.
Figure 18B:
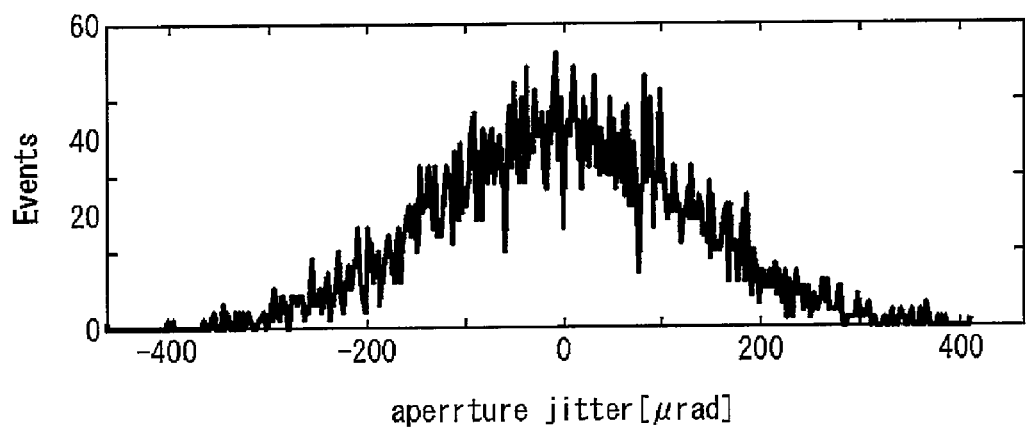
FIG. 18B is a histogram illustrating the phase noise waveform illustrated in FIG. 18A.

FIG. 18A illustrates the phase noise waveform in the time domain which is calculated from the single sideband spectrum illustrated in FIG. 16. FIG. 18B is a histogram illustrating the phase noise waveform illustrated in FIG. 18A. The vertical axis in FIG. 18A corresponds to the horizontal axis in FIG. 18B.

The SNR calculating section 26 may calculate the RMS value or peak-to-peak value of the phase noise waveform supplied thereto from the data processing section 24, based on the supplied phase noise waveform or the histogram of the supplied phase noise waveform. According to the present example, the RMS value is 127 μrad, and the peak-to-peak value is 465 μrad.

Figure 19A:
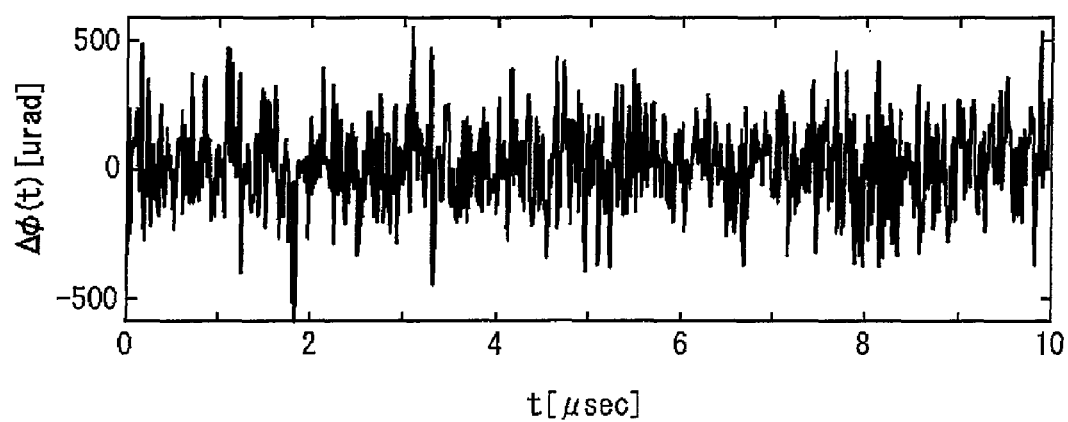
FIG. 19A illustrates the phase noise waveform in the time domain which is calculated from the single sideband spectrum illustrated in FIG. 17.
Figure 19B:
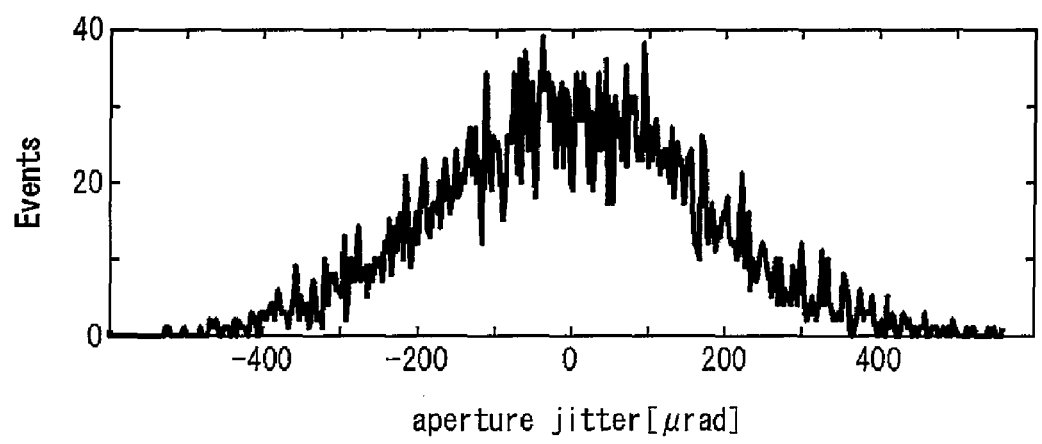
FIG. 19B is a histogram illustrating the phase noise waveform illustrated in FIG. 19A.

FIG. 19A illustrates the phase noise waveform in the time domain which is calculated from the single sideband spectrum illustrated in FIG. 17. FIG. 19B is a histogram illustrating the phase noise waveform illustrated in FIG. 19A.

According to the present example, the RMS value is 168 μrad, and the peak-to-peak value is 590 μrad.

The SNR calculating section 26 may calculate the SNR of the discrete waveform, based on the RMS value or peak-to-peak value of the phase noise waveform. For example, the SNR calculating section 26 may calculate the RMS value of the SNR ($SNR_{T,RMS}$) by assigning the RMS value of the phase noise waveform to the variable $\sigma_{\Delta\phi}$ in the following equation.

$$SNR_{T,\text{RMS}} = 10\log_{10}\frac{1}{\left(\frac{2\pi}{T_{in}}\sigma_{\Delta\phi}\right)^2} [\text{dB}] \qquad \text{Equation 10}$$

Similarly, the SNR calculating section 26 may calculate the peak-to-peak value of the SNR ($SNR_{T,PkPk}$) by assigning the peak-to-peak value of the phase noise waveform to the variable $d\{\Delta\phi\}$ in the following equation.

$$SNR_{T,PkPk} = 20\log_{10}\frac{1}{\left(\frac{2\pi}{T_{in}}d\{\Delta\phi\}\right)^2} [\text{dB}] \qquad \text{Equation 11}$$

Figure 20:
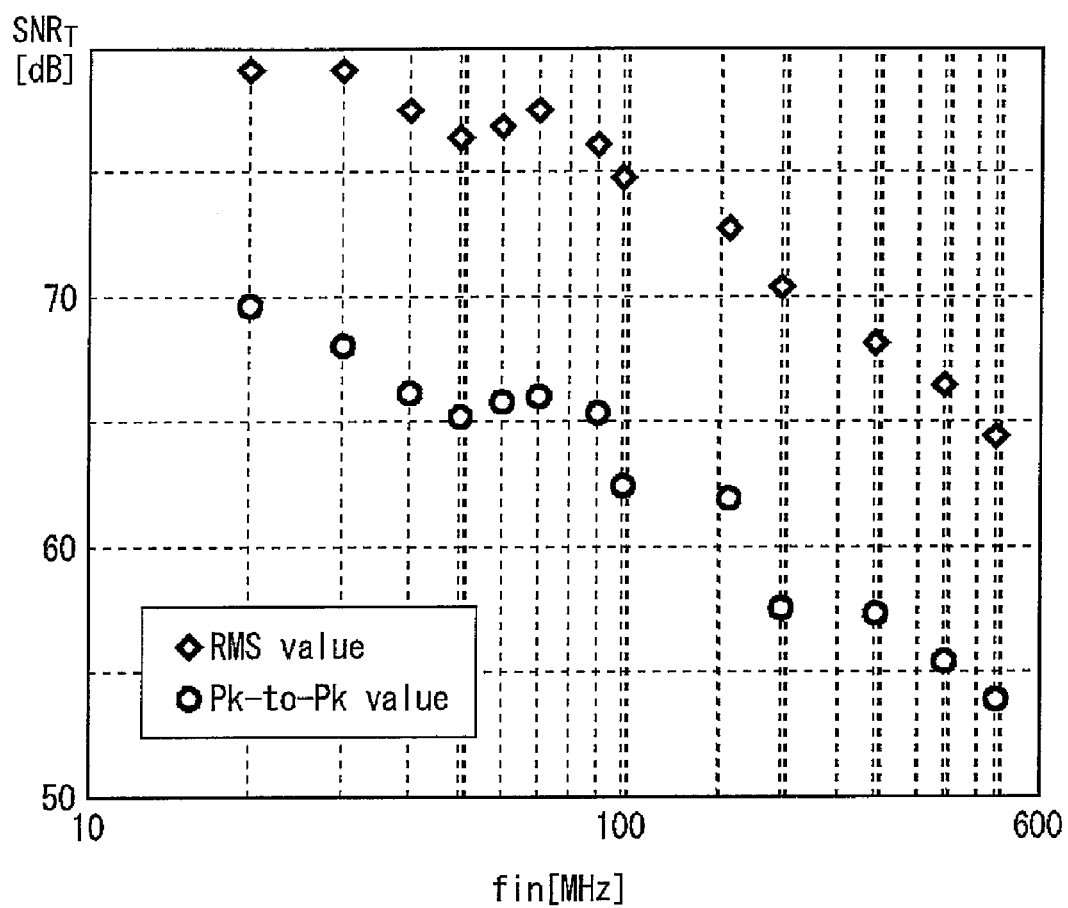
FIG. 20 illustrates, as an example, the SNR values calculated by an SNR calculating section 26.

FIG. 20 illustrates, as an example, the SNR calculated by the SNR calculating section 26. Specifically speaking, FIG. 20 illustrates the SNR which is calculated based on the RMS value of the phase noise waveform, and the SNR which is calculated based on the peak-to-peak value of the phase noise waveform. The effective bits measuring section 80 measures the ENOB of the AD converter 400 based on the SNR received from the SNR calculating section 26.

Figure 21:
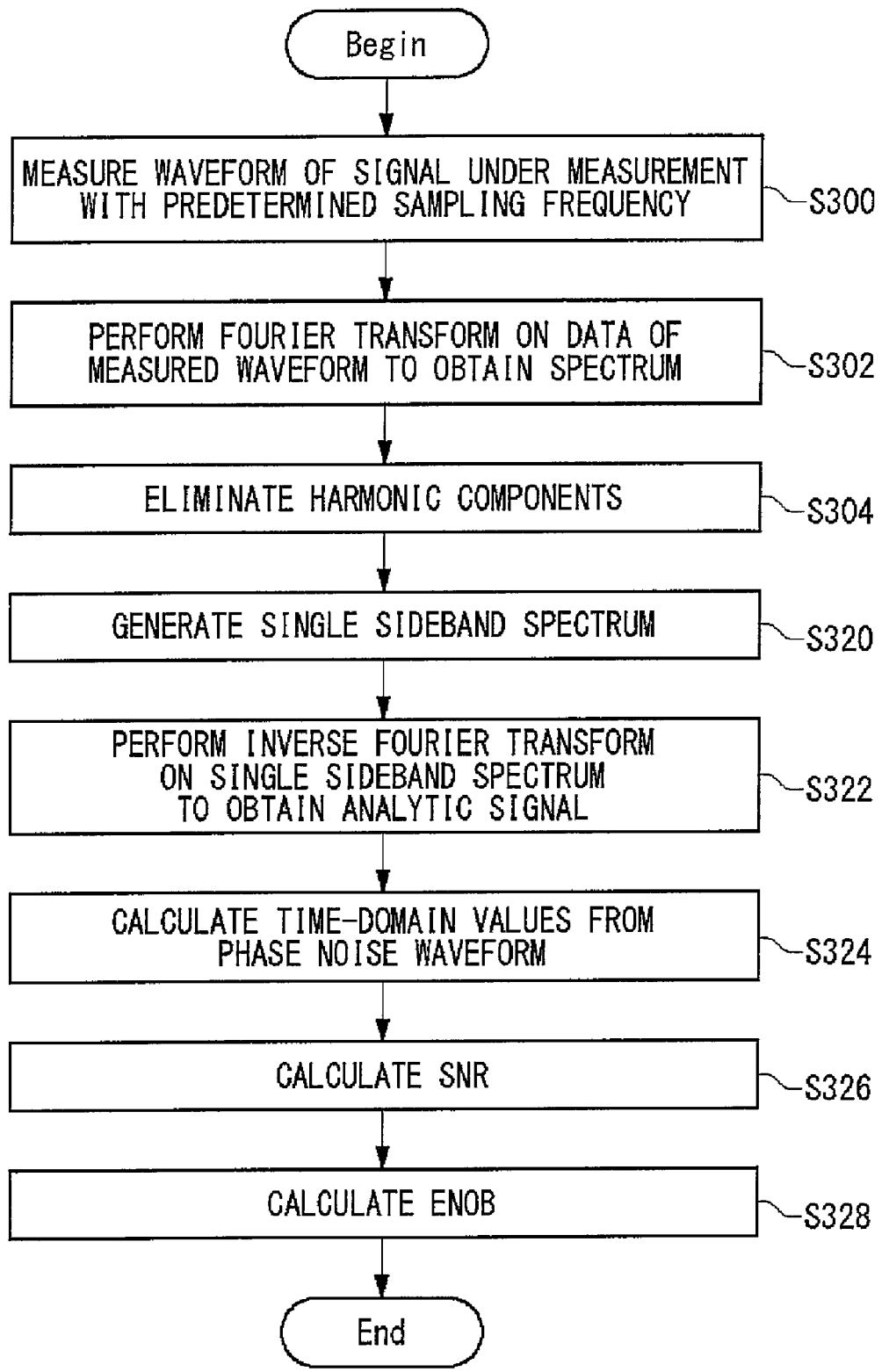
FIG. 21 is a flowchart illustrating an exemplary operation of the measuring apparatus 200 described with reference to FIGS. 15 to 20.

FIG. 21 is a flowchart illustrating an exemplary operation of the measuring apparatus 200 described with reference to FIGS. 15 to 20. Here, the procedure from the step S300 to the step S304 in FIG. 21 is the same as the procedure from the step S300 to the step S304 described with reference to FIG. 14, and therefore not explained here.

After eliminating the harmonic components of the spectrum, the single sideband spectrum generating section 34 generates the single sideband spectrum based on the resultant spectrum in the step S320. In the step S320, the single sideband spectrum generating section 34 may compensate the non-symmetric sideband in the single sideband spectrum, as mentioned earlier. After this, the phase noise waveform calculating section 30 performs the inverse Fourier transform on the single sideband spectrum, to generate the analytic signal for the discrete waveform in the step S322. Subsequently, the phase noise waveform calculating section 30 calculates the phase noise waveform of the discrete waveform based on the generated analytic signal, and calculates the time-domain values from the phase noise waveform, such as the RMS value and the peak-to-peak value in the step S324.

Following this, the SNR calculating section 26 calculates the SNR based on the time-domain values of the phase noise waveform in the step S316. The effective bits measuring section 80 then measures the ENOB based on the SNR in the step S318. The effective bits measuring section 80 may calculate the RMS value of the ENOB ($ENOB_{T,RMS}$) by assigning the RMS value of the SNR ($SNR_{T,RMS}$) to the equation 5. Additionally, the effective bits measuring section 80 may calculate the peak-to-peak value of the ENOB ($ENOB_{T,PkPk}$) by assigning the peak-to-peak value of the SNR ($SNR_{T,PkPk}$) to the equation 5. By performing the above-described procedure, the measuring apparatus 200 can accurately calculate the phase noise waveform to calculate the SNR and the ENOB.

In the procedure explained with reference to FIG. 21, the data processing section 24 may perform the Fourier transform on the phase noise waveform calculated in the step S324, so as to calculate the phase noise spectrum. If this is the case, the SNR calculating section 26 and the effective bits measuring section 80 may calculate the SNR and the ENOB in the manner described with reference to FIGS. 2 to 14.

With the processing relating to the present example, the measuring apparatus 200 can detect an accurate phase noise waveform, in other words, aperture jitter waveform, of the AD converter 400. The measuring apparatus 200 can produce the following effects.

(a) Even when the analog input into the AD converter 400 has a low frequency, the measuring apparatus 200 can measure the RMS value of the ENOB ($ENOB_{T, RMS}$) and the peak-to-peak value of the ENOB ($ENOB_{T,PkPk}$) without being masked by the quantization noise.

(b) The measuring apparatus 200 can perform the $ENOB_{T, RMS}$ test and the $ENOB_{T,PkPk}$ test only by using a low-frequency signal generator which is available at a low cost.

(c) The measuring apparatus 200 can obtain the aperture jitter waveform in the time domain. Accordingly, the measuring apparatus 200 can directly obtain the RMS value ($ENOB_{T,RMS}$) and the peak-to-peak value of the ENOB ($ENOB_{T, PkPk}$) from the RMS value $\sigma_{\Delta\phi}$ and the peak-to-peak value $d\{\Delta\phi\}$ of the aperture jitter waveform, respectively.

(d) Based on the RMS value of the ENOB ($ENOB_{T,RMS}$), the measuring apparatus 200 can obtain the average value of the ENOB due to the aperture jitter. Also, based on the RMS value of the ENOB ($ENOB_{T,PkPk}$), the measuring apparatus 200 can obtain the worst-case value of the ENOB due to the instantaneous aperture jitter.

(e) When the AD converter 400 experiences malfunction, the measuring apparatus 200 can analyze the cause of the malfunction. According to the present example, the measurement results can be fed back to the design of the AD converter 400.

As mentioned above, the measuring apparatus 200 relating to the present example directly calculates the ENOB from the phase noise waveform in the time domain, thereby being capable of measuring the peak-to-peak value of the ENOB ($ENOB_{T,PkPk}$). FIGS. 7 and 8 show the peak-to-peak value of the ENOB ($ENOB_{T,PkPk}$) which is measured by using the method described with reference to FIG. 21. When measured by using the method described with reference to FIG. 21, the RMS value of the ENOB is the same as the $ENOB_{T,RMS}$ shown in FIGS. 7 and 8.

As seen from FIGS. 7 and 8, the peak-to-peak value of the ENOB experiences a loss of approximately two bits, when compared with the RMS value. Note that the RMS value of the ENOB provides the average value of the ENOB of the AD converter 400, and that the peak-to-peak value of the ENOB provides the instantaneous ENOB of the AD converter 400. Here, the instantaneous ENOB may indicate the ENOB of the AD converter 400 at each moment. The peak-to-peak value of the ENOB may indicate the worst-case value of the instantaneous ENOB.

Figure 22:
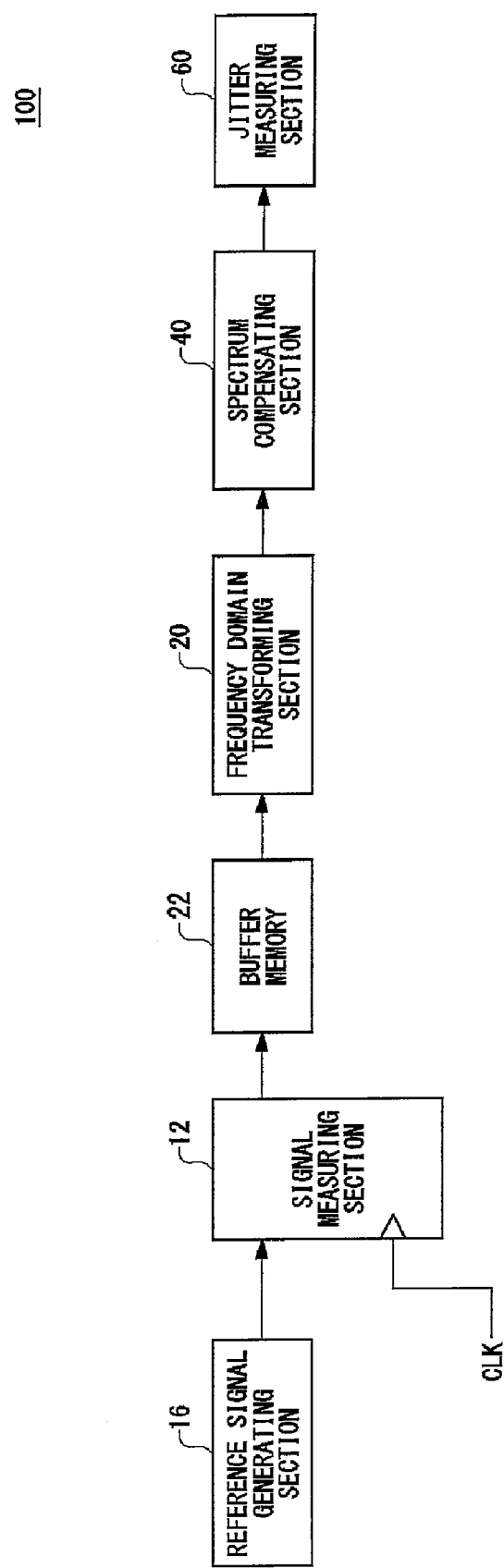
FIG. 22 illustrates an exemplary configuration of a measuring apparatus 100 relating to an embodiment of the present invention.

FIG. 22 illustrates an exemplary configuration of a measuring apparatus 100 relating to an embodiment of the present invention. The measuring apparatus 100 is designed for measuring the jitter of a clock signal under measurement CLK. The measuring apparatus 100 includes therein the reference signal generating section 16, a signal measuring section 12, the buffer memory 22, the frequency domain transforming section 20, the spectrum compensating section 40, and a jitter measuring section 60. The signal generated by the reference signal generating section 16 may be a periodic signal having a constant period, for example.

The signal measuring section 12 measures the input signal supplied thereto from the reference signal generating section 16 with the sampling frequency provided by the clock signal under measurement CLK. The signal measuring section 12 may be, for example, an AD converter which detects the signal level of the input signal in accordance with each rising edge of the clock signal under measurement CLK supplied thereto, and outputs the digital data sequence formed by the detected signal levels, or the output code sequence, as the discrete waveform of the input signal.

The buffer memory 22, the frequency domain transforming section 20 and the spectrum compensating section 40 may be the same as the buffer memory 22, the first frequency domain transforming section 20 and the spectrum compensating section 40 described with reference to FIGS. 1 and 2. The jitter measuring section 60 measures the jitter of the clock signal under measurement CLK based on the spectrum obtained as a result of the compensation performed by the spectrum compensating section 40. The jitter measuring section 60 may perform the inverse Fourier transform on the spectrum to generate the analytic signal, and measure the jitter from the analytic signal.

The jitter measuring section 60 may include therein the phase noise waveform calculating section 30 described with reference to FIG. 2. The jitter measuring section 60 may calculate the timing jitter sequence of the clock signal under measurement CLK, which indicates the jitter at each edge of the clock signal under measurement, by re-sampling the phase noise waveform generated by the phase noise waveform calculating section 30 in accordance with the timing of each edge of the clock signal under measurement CLK. The jitter measuring section 60 may also calculate the RMS value, the peak-to-peak value and other values of the timing jitter sequence. Also, the jitter measuring section 60 may calculate the period jitter sequence of the clock signal under measurement by calculating the sequence of the differences each of which is calculated based on two adjacent values in the timing jitter sequence.

With the above-described configuration, the measuring apparatus 100 can measure the jitter of the clock signal under measurement CLK. When the measuring apparatus 100 measures the jitter of the clock signal under measurement CLK, it is preferable that the jitter generated by the signal measuring section 12 is as small as possible or known in advance.

Figure 23:
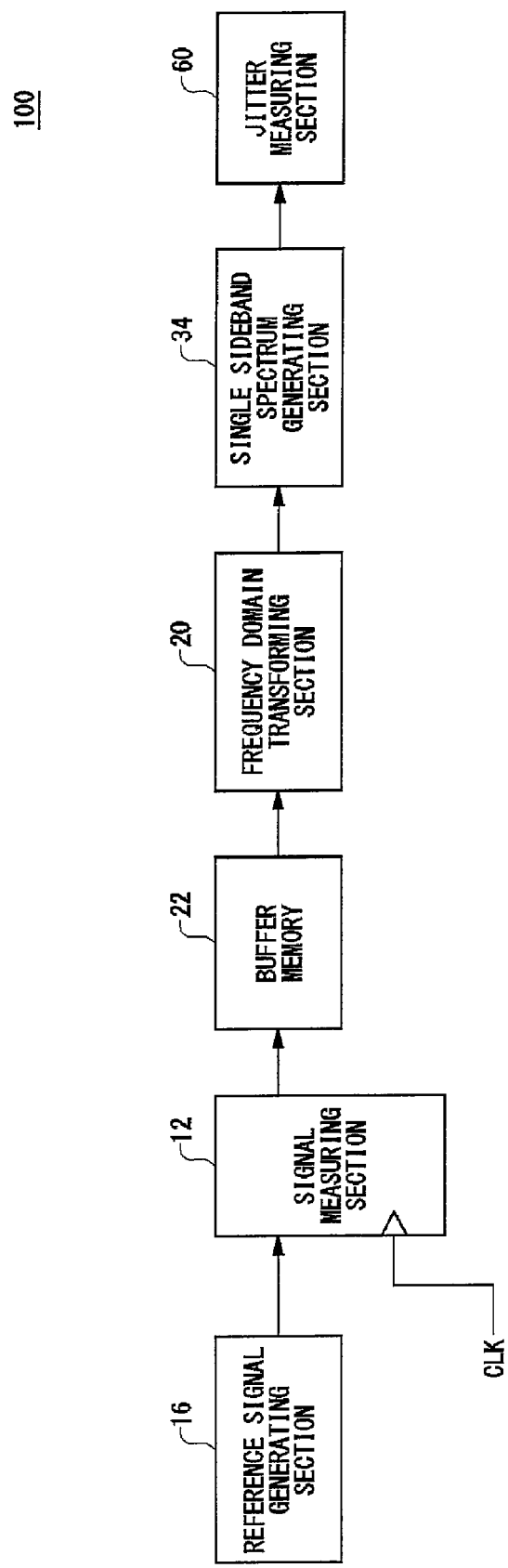
FIG. 23 illustrates another exemplary configuration of the measuring apparatus 100.

FIG. 23 illustrates another exemplary configuration of the measuring apparatus 100. The measuring apparatus 100 relating to the present example is different from the measuring apparatus 100 shown in FIG. 22 in that the single sideband spectrum generating section 34 is included in place of the spectrum compensating section 40. Except for this, the measuring apparatus 100 relating to the present example may be the same as the measuring apparatus 100 shown in FIG. 22.

The single sideband spectrum generating section 34 may be the same as the single sideband spectrum generating section 34 described with reference to FIG. 15. The jitter measuring section 60 may include therein the phase noise waveform calculating section 30 described with reference to FIG. 15. Having the above configuration, the measuring apparatus 100 relating to the present example can calculate an accurate phase noise waveform. Therefore, the measuring apparatus 100 can accurately measure the jitter of the clock signal under measurement CLK. Additionally, the single sideband spectrum generating section 34 may compensate the non-symmetric sideband in the single sideband spectrum by carrying on the procedure performed by the spectrum compensating section 40 which is described with reference to the step S306 in FIG. 14, as mentioned earlier.

Figure 24A:
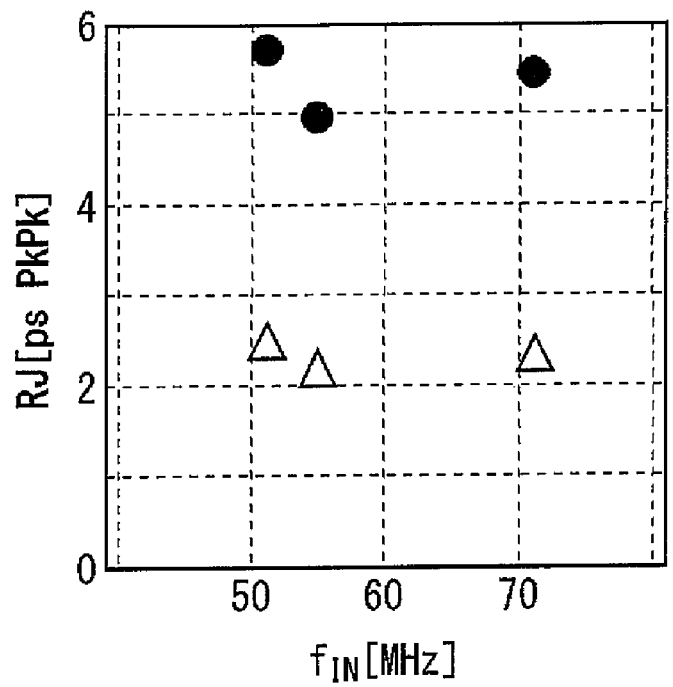
FIG. 24A illustrates the measurement results of the peak-to-peak value of the instantaneous phase noise or the measurement results of the peak-to-peak value of the phase jitter.
Figure 24B:
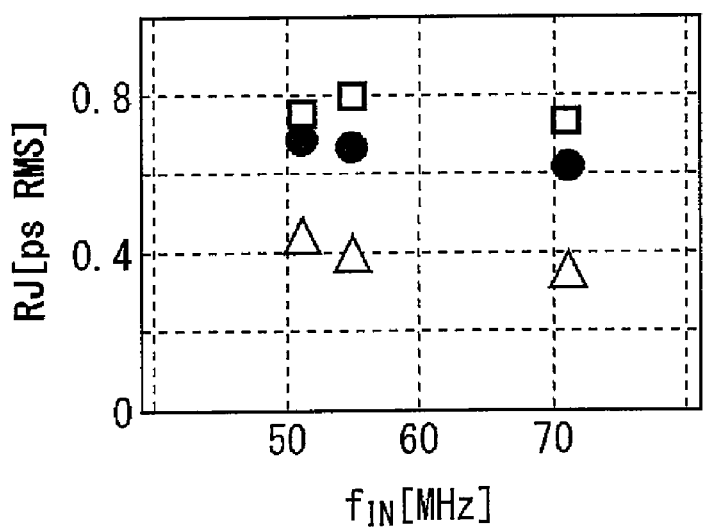
FIG. 24B illustrates the measurement results of the RMS value of the jitter.
Figure 28A:
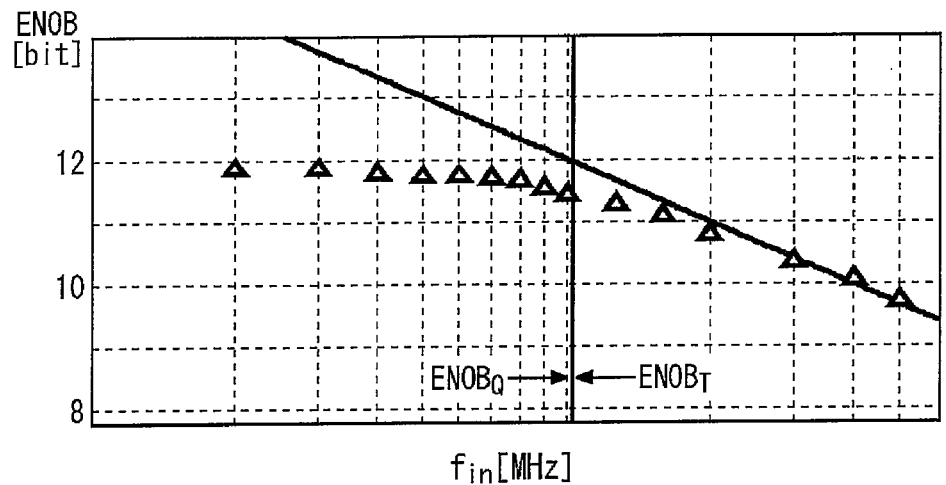
FIG. 28A illustrates, as an example, the relation between the ENOB of an AD converter and the frequency of an analog input into the AD converter.
Figure 28B:
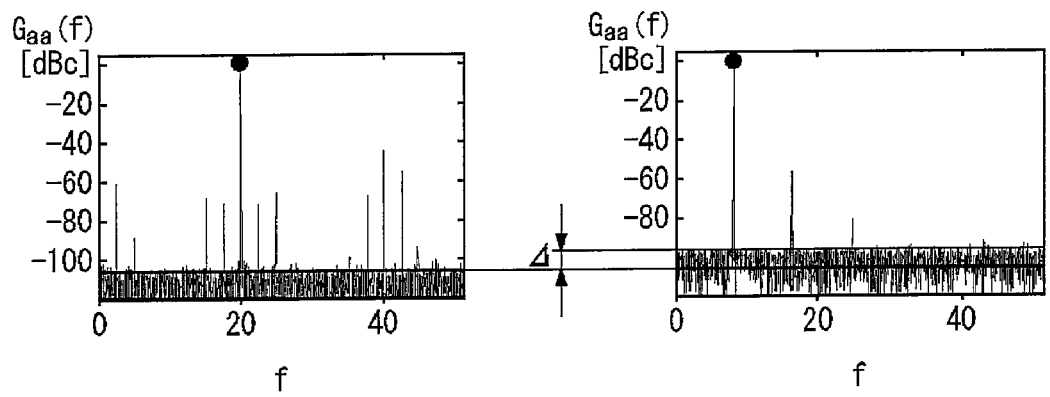
FIG. 28B illustrates, as an example, the spectrum obtained by performing the Fourier transform on an output from the AD converter.
Figure 29:
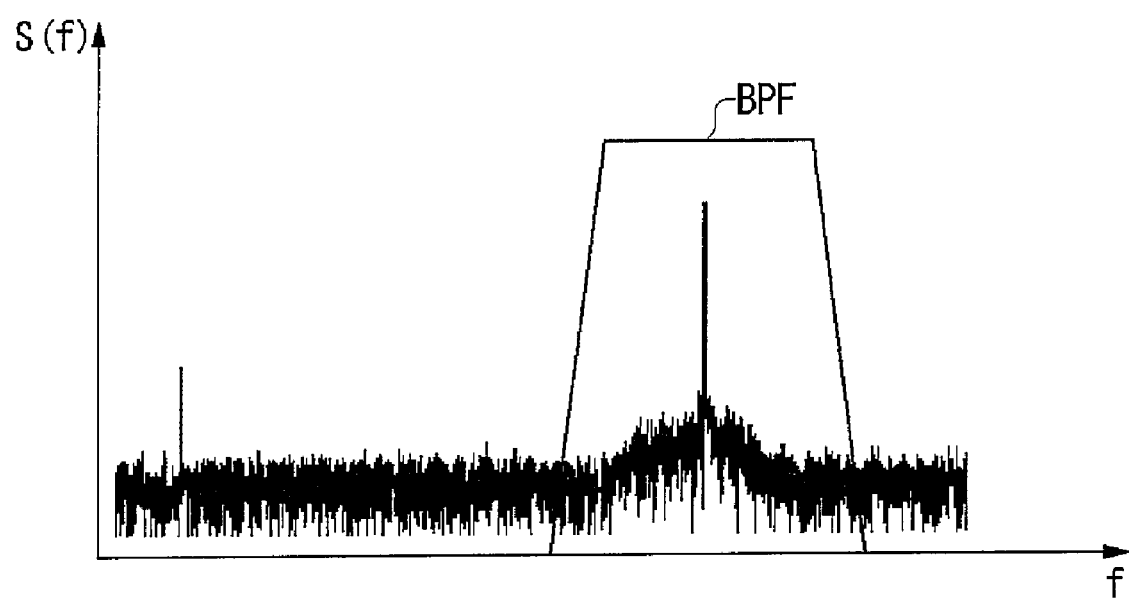
FIG. 29 illustrates a different method to measure jitter based on the spectrum obtained by performing the Fourier transform on the output from the AD converter.

FIG. 24A illustrates the measurement results of the peak-to-peak value of the instantaneous phase noise, or the measurement results of the peak-to-peak value of the phase jitter. FIG. 24B illustrates the measurement results of the RMS value of the jitter. In FIGS. 24A and 24B, the measurement results obtained by using the measuring apparatus 100 described with reference to FIG. 22 are indicated by circles, the measurement results obtained by using the method described with reference to FIG. 28B are indicated by squares, and the measurement results obtained by using the method described with reference to FIG. 29 are indicated by triangles.

The fundamental frequency of the signal under measurement is set at three different values of 51 MHz, 55 MHz and 71 MHz. When the method described with reference to FIG. 29 is used, the jitter values are calculated based on the frequency components in the range of +−2 MHz with respect to the fundamental frequency.

As seen from FIGS. 24A and 24B, the method described with reference to FIG. 28B can not measure the peak-to-peak value of the jitter, but the measuring apparatus 100 can measure the peak-to-peak value of the jitter. Also, FIGS. 24A and 24B indicate that the jitter values measured by using the measuring apparatus 100 are larger than the jitter values measured by using the method described with reference to FIG. 29. This is because the measuring apparatus 100 measures the jitter in a wider band than the method described with reference to FIG. 29. As is apparent from the above description, the measuring apparatus 100 can accurately measure the jitter in a wide band, and measure the peak-to-peak value of the jitter.

Figure 25:
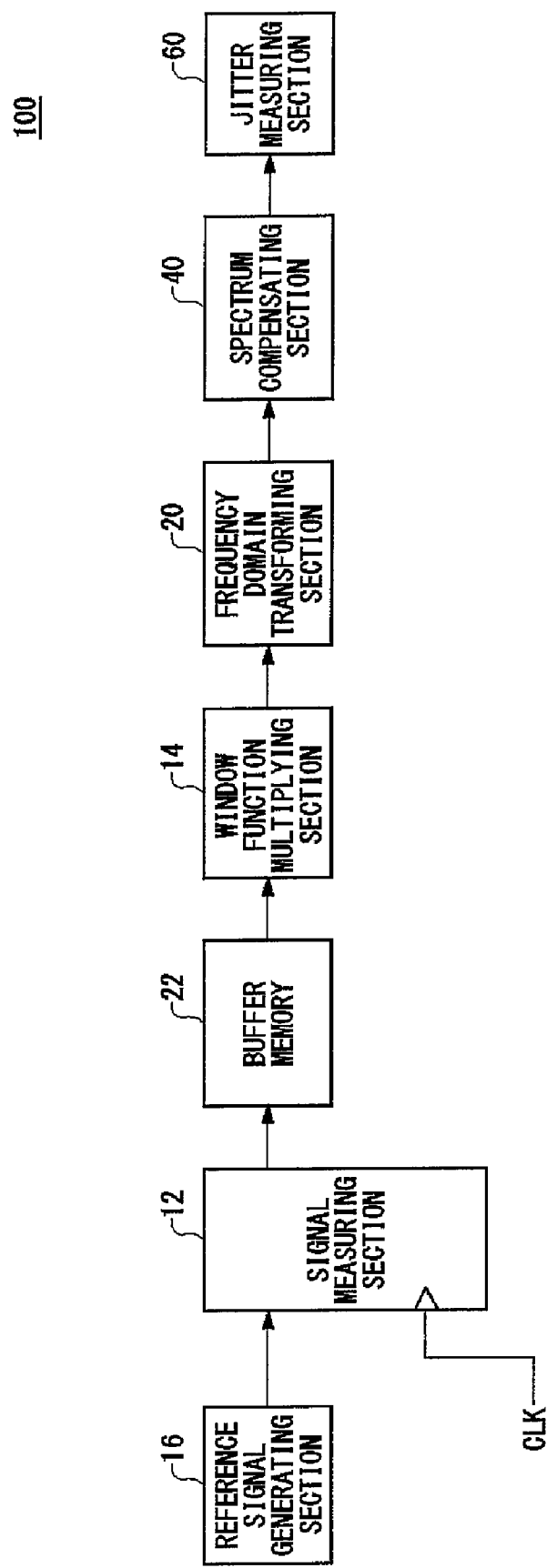
FIG. 25 illustrates a further different example of the configuration of the measuring apparatus 100.

FIG. 25 illustrates a further different exemplary configuration of the measuring apparatus 100. According to the present example, the measuring apparatus 100 includes a window function multiplying section 14 in addition to the constituents of the measuring apparatus 100 described with reference to FIG. 22 or 23. Except for the window function multiplying section 14, the measuring apparatus 100 relating the present example may be the same as the measuring apparatus 100 described with reference to FIG. 22 or 23. Here, the window function multiplying section 14 is provided as the following stage of the buffer memory 22. FIG. 25 illustrates the configuration which is achieved by adding the window function multiplying section 14 to the configuration of the measuring apparatus 100 shown in FIG. 22, but the window function multiplying section 14 may be added to the configuration of the measuring apparatus 100 illustrated in FIG. 23. Similarly, the window function multiplying section 14 may be added to the measuring apparatus 200 described with reference to FIGS. 1 to 21.

The window function multiplying section 14 may multiply the sampling result obtained by the signal measuring section 12 by a predetermined window function, and input the result of the multiplication into the frequency domain transforming section 20. For example, the window function multiplying section 14 may multiply the data sequence by a window function whose value is substantially equal to zero at the both ends and is substantially equal to one at the middle. An example of such a window function is Hanning window function. In this manner, even when the data sequence generated by the signal measuring section 12 does not have a data length equal to an integral multiple of the period of the signal under measurement, the measuring apparatus 100 can calculate the spectrum by performing the Fourier transform on the data sequence.

For example, even when the clock generating section 10 generates a sampling clock which is not coherent with the period of the signal under measurement, the measuring apparatus 100 configured by using the window function multiplying section 14 can accurately transform the sampling result into the signal in the frequency domain.

The jitter measuring section 60 may include therein a correcting section that corrects the instantaneous phase noise calculated by the instantaneous phase noise calculating section 66. The instantaneous phase noise calculated by the instantaneous phase noise calculating section 66 contains an error attributable to the multiplication of the window function performed by the window function multiplying section 14. The correcting section corrects the instantaneous phase noise by using the window function multiplied by the window function multiplying section 14. For example, the correcting section may divide the instantaneous phase noise in the time domain Δφ(t) which is calculated by the instantaneous phase noise calculating section 66 by the window function in the time domain w(t), and output the result of the division Δφ(t)/w(t) as the corrected instantaneous phase noise function.

Figure 26A:
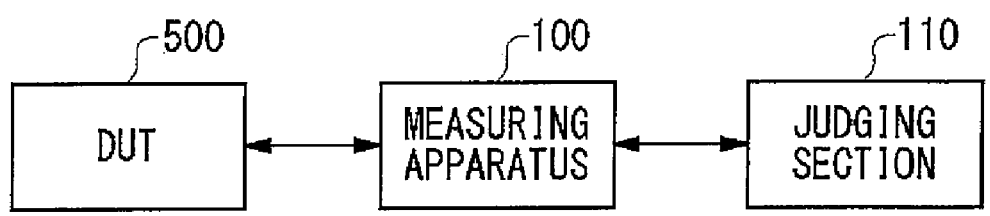
FIG. 26A illustrates an exemplary configuration of a test apparatus 600 relating to an embodiment of the present invention.

FIG. 26A illustrates an exemplary configuration of a test apparatus 600 relating to an embodiment of the present invention. The test apparatus 600 is designed for testing a device under test 500 such as a semiconductor chip. The test apparatus 600 includes therein the measuring apparatus 100 and a judging section 110. The measuring apparatus 100 measures the jitter of the signal under measurement output from the device under test 500. The signal under measurement may be a clock signal. The measuring apparatus 100 may be the same as the measuring apparatus 100 described with reference to FIGS. 22 to 25.

The measuring apparatus 100 may additionally include a signal input section that inputs a predetermined test signal into the device under test 500 to cause the device under test 500 to output the signal under measurement. The judging section 110 judges whether the device under test 500 is acceptable based on the jitter measured by the measuring apparatus 100. For example, the judging section 110 may judge whether the device under test 500 is acceptable based on whether the RMS value, the peak-to-peak value or the like of the jitter falls within a predetermined range.

Figure 26B:
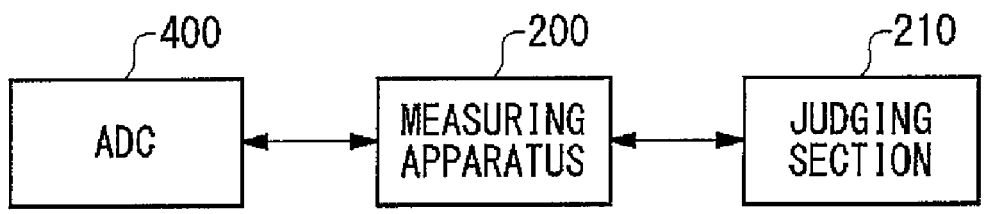
FIG. 26B illustrates an exemplary configuration of a test apparatus 700 relating to an embodiment of the present embodiment.

FIG. 26B illustrates an exemplary configuration of a test apparatus 700 relating to another embodiment of the present embodiment. The test apparatus 700 is designed to test the AD converter 400. The test apparatus 700 includes therein the measuring apparatus 200 and a judging section 210. The measuring apparatus 200 measures the jitter of the signal output from the AD converter 400. The measuring apparatus 200 may be the same as the measuring apparatus 200 described with reference to FIGS. 1 to 21.

The judging section 210 judges whether the AD converter 400 is acceptable based on the result of the measurement done by the measuring apparatus 200. For example, the judging section 210 may judge whether the AD converter 400 is acceptable based on whether the SNR of the discrete waveform output from the AD converter 400, the ENOB of the AD converter 400, the best-case values of the SNR and the ENOB, the worst-case values of the SNR and the ENOB, the RMS value of the phase noise waveform, or the peak-to-peak value of the phase noise waveform falls within the predetermined range.

Figure 27:
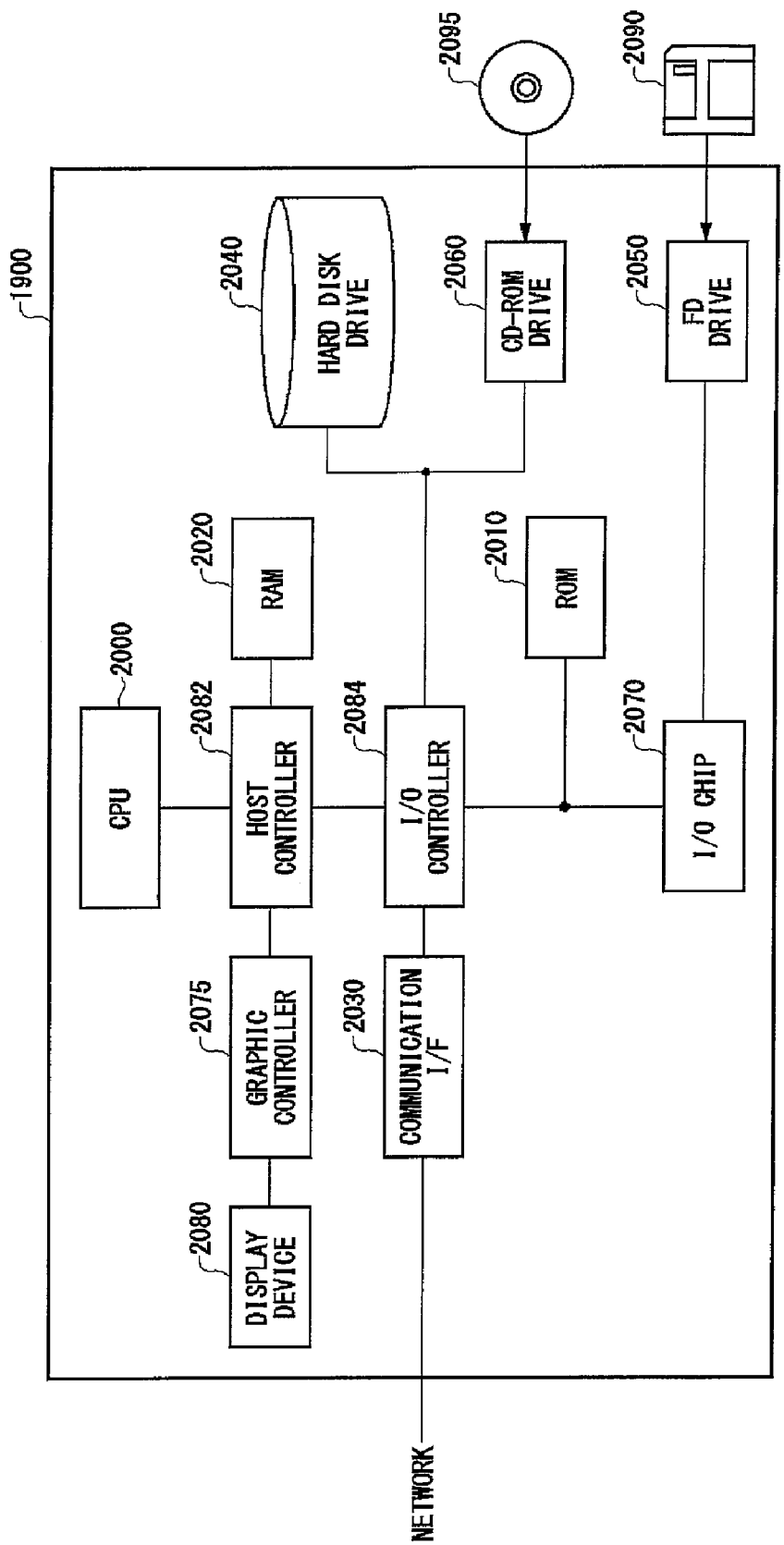
FIG. 27 illustrates an exemplary configuration of a computer 1900.

FIG. 27 illustrates an exemplary configuration of a computer 1900. The computer 1900 may control one of the measuring apparatuses 100 and 200 and the test apparatuses 600 and 700 described with reference to FIGS. 1 to 26B so as to function as described with reference to FIGS. 1 to 26B, in accordance with the programs supplied thereto. The computer 1900 may function as at least some of the constituents of one of the measuring apparatuses 100 and 200 and the test apparatus 600 and 700.

The programs supplied to the computer 1900 may cause the computer 1900 to control one of the measuring apparatuses 100 and 200 and the test apparatuses 600 and 700. Alternatively, the programs may cause the computer 1900 to function as at least some of the constituents of one of the measuring apparatuses 100 and 200 and the test apparatuses 600 and 700.

The computer 1900 relating to the present embodiment is constituted by a CPU surrounding section, an input/output I/O section and a legacy I/O section. The CPU surrounding section includes a CPU 2000, a RAM 2020, a graphic controller 2075 and a display device 2080 which are connected to each other by means of a host controller 2082. The I/O section includes a communication interface 2030, a hard disk drive 2040, and a CD-ROM drive 2060 which are connected to the host controller 2082 by means of an I/O controller 2084. The legacy I/O section includes a ROM 2010, a flexible disk drive 2050, and an I/O chip 2070 which are connected to the I/O controller 2084.

The host controller 2082 connects the RAM 2020 with the CPU 2000 and graphic controller 2075 which access the RAM 2020 at a high transfer rate. The CPU 2000 operates in accordance with programs stored on the ROM 2010 and RAM 2020, to control the constituents. The graphic controller 2075 obtains image data which is generated by the CPU 2000 or the like on a frame buffer provided within the RAM 2020, and causes the display device 2080 to display the obtained image data. Alternatively, the graphic controller 2075 may include therein a frame buffer for storing thereon the image data generated by the CPU 2000 or the like.

The I/O controller 2084 connects, to the host controller 2082, the hard disk drive 2040, communication interface 2030 and CD-ROM drive 2060 which are I/O devices operating at a relatively high rate. The communication interface 2030 communicates with external apparatuses via the network. The hard disk drive 2040 stores thereon programs and data to be used by the CPU 2000 in the computer 1900. The CD-ROM drive 2060 reads programs or data from a CD-ROM 2095, and supplies the read programs or data to the hard disk drive 2040 via the RAM 2020.

The I/O controller 2084 is also connected to the ROM 2010, flexible disk drive 2050 and I/O chip 2070 which are I/O devices operating at a relatively low rate. The ROM 2010 stores thereon a boot program executed by the computer 1900 at the startup, programs dependent on the hardware of the computer 1900, and the like. The flexible disk drive 2050 reads programs or data from a flexible disk 2090, and supplies the read programs or data to the hard disk drive 2040 via the RAM 2020. The I/O chip 2070 is connected to the flexible disk drive 2050, and used to connect a variety of I/O devices to the computer 1900, via a parallel port, a serial port, a keyboard port, a mouse port or the like.

The programs to be provided to the hard disk drive 2040 via the RAM 2020 are provided by a user in the state of being stored on a recording medium such as the flexible disk 2090, the CD-ROM 2095, and an IC card. The programs are read from the recording medium, and the read programs are installed in the hard disk drive 2040 in the computer 1900 via the RAM 2020, to be executed by the CPU 2000.

The programs are installed in the computer 1900. The programs may request the CPU 2000 or the like to cause the computer 1900 to control one of the measuring apparatuses 100 and 200 and the test apparatuses 600 and 700. Alternatively, the programs may request the CPU 2000 or the like to cause the computer 1900 to function as at least some of the constituents of one of the measuring apparatuses 100 and 200 and the test apparatuses 600 and 700.

The programs mentioned above may be stored on an external recording medium. Such a recording medium is, for example, an optical recording medium such as DVD and CD, a magnet-optical recording medium such as MO, a tape medium, a semiconductor memory such as an IC card and the like, in addition to the flexible disk 2090 and CD-ROM 2095. Alternatively, the recording medium may be a storage device such as a hard disk or RAM which is provided in a server system connected to a dedicated communication network or the Internet, and the programs may be provided to the computer 1900 via the network.

The measuring apparatus 200 and the AD converter 400 described with reference to FIGS. 1 to 21 may be provided in the same electronic device. For example, the AD converter 400 may correspond to a circuit used for the actual operation of the electronic device, and the measuring apparatus 200 may correspond to the self-diagnosis circuit for the AD converter 400.

The buffer memory 22 may also be used during the actual operation of the electronic device. The data processing section 24 may retrieve the data indicating the discrete waveform from the buffer memory 22 when the measuring apparatus 200 carries out the analysis of the AD converter 400.

The data processing section 24 may process the data by using the digital signal processor (DSP) core, the microprocessing unit (MPU) core, the fast Fourier transform (FFT) core, and the like which are integrated into the electronic device. The electronic device may be a transceiver chip used for wireless communication and other techniques.

Similarly, the measuring apparatus 100 and the signal measuring section 12 described with reference to FIGS. 22 to 26B may be provided in the same electronic device. For example, the signal measuring section 12 may correspond to the circuit used for the actual operation of the electronic device, and the measuring apparatus 100 may correspond to the self-diagnosis circuit for the signal measuring section 12.

The buffer memory 22 may also be used during the actual operation of the electronic device. The data processing section 24, which is constituted by the window function multiplying section 14, the frequency domain transforming section 20, the spectrum compensating section 40, the single sideband spectrum generating section 34, and the jitter measuring section 60 as illustrated in FIGS. 22 to 26B, may retrieve the data indicating the discrete waveform from the buffer memory 22 when the measuring apparatus 100 carries out the diagnosis of the signal measuring section 12.

Although some aspects of the present invention have been described by way of exemplary embodiments, it should be understood that those skilled in the art might make many changes and substitutions without departing from the spirit and the scope of the present invention which is defined only by the appended claims.

As clearly explained in the above description, the embodiments of the present invention can accurately measure the SNR of the discrete waveform output from the AD converter, and the ENOB of the AD converter. Also, the embodiments of the present invention can calculate the best-case and worst-case values of the ENOB and the SNR in a predetermined band, by using the input signal having a single frequency.

Additionally, the embodiments of the present invention can accurately measure the jitter in a wide band of the clock signal under measurement. Furthermore, the embodiments of the present invention can accurately measure the RMS value, the peak-to-peak value or the like of the jitter.

What is claimed is:

1. A measuring apparatus for measuring a signal-to-noise ratio of a discrete waveform which is output from an AD converter in response to an input signal, the signal-to-noise ratio indicating a ratio of a signal component of the input signal to noise generated by the AD converter, the measuring apparatus comprising:

a spectrum compensating section that receives a spectrum of the discrete waveform output from the AD converter, and compensates the received spectrum in accordance with a non-symmetric sideband between an upper sideband and a lower sideband of the received spectrum, the upper and lower sidebands being defined with respect to a fundamental frequency of the input signal, the non-symmetric sideband being a portion of one of the upper and lower sidebands in the positive frequency range of the spectrum that does not overlap the other one of the upper and lower sidebands when the spectrum is centered around the fundamental frequency of the input signal so that the upper and lower sidebands overlap each other; and a phase noise waveform calculating section that calculates a phase noise waveform of the discrete waveform based on the spectrum which has been compensated by the spectrum compensating section.

2. The measuring apparatus as set forth in claim 1, wherein the spectrum compensating section compensates the received spectrum by doubling frequency components in the non-symmetric sideband in power equivalent.

3. The measuring apparatus as set forth in claim 1, wherein the spectrum compensating section compensates the received spectrum by reducing, to half in power equivalent, frequency components in symmetric bands between the upper and lower sidebands, excluding frequency components in the non-symmetric sideband.

4. The measuring apparatus as set forth in claim 1, further comprising an SNR calculating section that calculates the signal-to-noise ratio based on the phase noise waveform.

5. The measuring apparatus as set forth in claim 4, further comprising a frequency domain transforming section that converts the phase noise waveform calculated by the phase noise waveform calculating section into a phase noise spectrum in a frequency domain.

6. The measuring apparatus as set forth in claim 5, wherein the SNR calculating section calculates the signal-to-noise ratio based on a value obtained by adding together individual frequency components in a predetermined band of the phase noise spectrum.

7. The measuring apparatus as set forth in claim 5, further comprising an effective bits measuring section that calculates an effective number of bits of the AD converter based on the signal-to-noise ratio.

8. The measuring apparatus as set forth in claim 7, wherein based on a spectrum of a discrete waveform output from the AD converter in response to an input signal having a predetermined frequency, the effective bits measuring section calculates at least one of a best-case value and a worst-case value of the effective number of bits which are observed when the input signal input into the AD converter has a different frequency from the predetermined frequency.

9. The measuring apparatus as set forth in claim 7, further comprising a reference signal generating section that inputs into the AD converter an input signal whose frequency is lower than an Nyquist frequency of a sampling clock for the AD converter, wherein based on a spectrum of a discrete waveform output from the AD converter in response to the input signal whose frequency is lower than the Nyquist frequency, the effective bits measuring section calculates at least one of a best-case value and a worst-case value of the effective number of bits which are observed when the input signal input into the AD converter has a frequency higher than the Nyquist frequency.

10. The measuring apparatus as set forth in claim 1, wherein the spectrum compensating section eliminates harmonic components of a fundamental component at the fundamental frequency of the input signal, from the received spectrum.

11. The measuring apparatus as set forth in claim 10, further comprising a frequency domain transforming section that transforms the discrete waveform output from the AD converter into the spectrum having an observable band ranging from a frequency zero to a frequency corresponding to a sampling frequency of the AD converter, wherein the spectrum compensating section detects a harmonic component folded so as to be positioned within the observable band, based on the fundamental frequency of the input signal.

12. The measuring apparatus as set forth in claim 1, wherein the phase noise waveform calculating section includes:

an analytic signal generating section that generates an analytic signal by transforming the spectrum which has been compensated by the spectrum compensating section into a signal in a time domain;

an instantaneous phase calculating section that calculates an instantaneous phase of the input signal based on the analytic signal; and an instantaneous phase noise calculating section that calculates the phase noise waveform of the discrete waveform based on the instantaneous phase of the input signal.

13. A test apparatus for testing an AD converter, comprising:

a measuring apparatus that measures one of (i) a signal-to-noise ratio of a discrete waveform which is output from the AD converter in response to an input signal and (ii) an effective number of bits of the AD converter; and a judging section that judges whether the AD converter is acceptable based on a result of the measurement by the measuring apparatus, wherein the measuring apparatus includes:

a spectrum compensating section that receives a spectrum of the discrete waveform output from the AD converter, and compensates the received spectrum in accordance with a non-symmetric sideband between an upper sideband and a lower sideband of the received spectrum, the upper and lower sidebands being defined with respect to a fundamental frequency of the input signal, the non-symmetric sideband being a portion of one of the upper and lower sidebands in the positive frequency range of the spectrum that does not overlap the other one of the upper and lower sidebands when the spectrum is centered around the fundamental frequency of the input signal so that the upper and lower sidebands overlap each other; and a phase noise waveform calculating section that calculates a phase noise waveform of the discrete waveform based on the spectrum which has been compensated by the spectrum compensating section.

14. A non-transitory recording medium storing thereon a program that causes a computer to function as a measuring apparatus that measures a signal-to-noise ratio of a discrete waveform which is output from an AD converter in response to an input signal, the signal-to-noise ratio indicating a ratio of a signal component of the input signal to noise generated by the AD converter, the program causing the computer to function as:

a spectrum compensating section that receives a spectrum of the discrete waveform output from the AD converter, and compensates the received spectrum in accordance with a non-symmetric sideband between an upper sideband and a lower sideband of the received spectrum, the upper and lower sidebands being defined with respect to a fundamental frequency of the input signal, the non-symmetric sideband being a portion of one of the upper and lower sidebands in the positive frequency range of the spectrum that does not overlap the other one of the upper and lower sidebands when the spectrum is centered around the fundamental frequency of the input signal so that the upper and lower sidebands overlap each other; and a phase noise waveform calculating section that calculates a phase noise waveform of the discrete waveform based on the spectrum which has been compensated by the spectrum compensating section.

15. An electronic device including:

an AD converter; and a data processing section that measures noise generated by the AD converter, wherein the data processing section includes:

a spectrum compensating section that receives a spectrum of a discrete waveform which is output from the AD converter in response to an input signal, and compensates the received spectrum in accordance with a non-symmetric sideband between an upper sideband and a lower sideband of the received spectrum, the upper and lower sidebands being defined with respect to a fundamental frequency of the input signal, and the non-symmetric sideband being a portion of one of the upper and lower sidebands in the positive frequency range of the spectrum that does not overlap the other one of the upper and lower sidebands when the spectrum is centered around the fundamental frequency of the input signal so that the upper and lower sidebands overlap each other; and a phase noise waveform calculating section that calculates a phase noise waveform of the discrete waveform based on the spectrum which has been compensated by the spectrum compensating section.

16. The electronic device as set forth in claim 15, wherein the data processing section retrieves data indicating the discrete waveform, when diagnosing the AD converter.

17. The electronic device as set forth in claim 15, further comprising a buffer that stores thereon data indicating the discrete waveform output from the AD converter, wherein the data processing section retrieves the data indicating the discrete waveform from the buffer, when diagnosing the AD converter.

* * * * *